US007901289B2

(12) United States Patent
Schlottmann et al.

(10) Patent No.: US 7,901,289 B2
(45) Date of Patent: Mar. 8, 2011

(54) TRANSPARENT OBJECTS ON A GAMING MACHINE

(75) Inventors: Gregory A. Schlottmann, Sparks, NV (US); Johnny L. Palchetti, Henderson, NV (US); Robert E. Breckner, Reno, NV (US); Nicole Beaulieu, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 12/024,931

(22) Filed: Feb. 1, 2008

(65) Prior Publication Data

US 2008/0188303 A1 Aug. 7, 2008

Related U.S. Application Data

(63) Continuation-in-part of application No. 11/112,076, filed on Apr. 22, 2005, now Pat. No. 7,465,230, which is a continuation of application No. 09/927,901, filed on Aug. 9, 2001, now Pat. No. 6,887,157, application No. 12/024,931, which is a continuation of application No. 10/272,788, filed on Oct. 17, 2002, now abandoned.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ................. 463/32; 463/30; 463/13; 463/27; 463/34; 345/340; 345/349; 345/352; 273/292; 273/85; 273/274; 273/143 R

(58) Field of Classification Search ..................... 463/32
See application file for complete search history.

(56) References Cited

U.S. PATENT DOCUMENTS 4,332,389 A 6/1982 Loyd, Jr. et al.
(Continued)

FOREIGN PATENT DOCUMENTS

AU 200179477 5/2002
(Continued)

OTHER PUBLICATIONS

Microsoft Press Computer Dictionary Third Edition Redmond, WA 1997 p. 406.

(Continued)

*Primary Examiner* — Paul A. D'Agostino
(74) *Attorney, Agent, or Firm* — Weaver Austin Villeneuve & Sampson LLP

(57) ABSTRACT

In one embodiment, a gaming apparatus is provided. The gaming apparatus may comprise a display unit, a value input device, and a controller operatively coupled to the display unit and the value input device. The controller may comprise a microprocessor and a memory operatively coupled to the microprocessor. The controller may be configured to generate a representation of a game display in a three dimensional (3D) graphics space, and to convert a view of the 3D graphics space into display data for display on the display unit, the view including the game display. The controller may also be configured to cause the display unit to display the display data, the display data including the view of the 3D graphics space, and to allow a person to make a wager. The controller may additionally be configured to cause the display unit to display a secondary display, the secondary display overlapping, at least in part, the game display, wherein the secondary display appears at least partially transparent.

30 Claims, 24 Drawing Sheets

U.S. PATENT DOCUMENTS 4,365,810 A 12/1982 Richardson
4,373,726 A 2/1983 Churchill et al.
4,455,025 A 6/1984 Itkis
4,572,509 A 2/1986 Sitrick
4,624,462 A 11/1986 Itkis
4,634,126 A 1/1987 Kimura
4,798,387 A 1/1989 Richardson
4,823,345 A 4/1989 Daniel et al.
4,848,771 A 7/1989 Richardson
4,856,787 A * 8/1989 Itkis .............................. 273/237
4,885,703 A 12/1989 Deering
4,914,607 A * 4/1990 Takanashi et al. ............ 715/790
4,986,543 A 1/1991 Heller
5,007,649 A 4/1991 Richardson
5,227,771 A 7/1993 Kerr et al.
5,242,163 A 9/1993 Fulton
5,255,352 A 10/1993 Faulk
5,297,802 A 3/1994 Pocock et al.
5,303,388 A * 4/1994 Kreitman et al. ............. 715/836
5,339,390 A 8/1994 Robertson et al.
5,342,047 A * 8/1994 Heidel et al. .................... 463/29
5,351,970 A 10/1994 Fioretti
5,393,057 A 2/1995 Marnell, II
5,435,554 A 7/1995 Lipson
5,455,904 A 10/1995 Bouchet et al.
5,469,536 A 11/1995 Blank
5,485,197 A * 1/1996 Hoarty ............................ 725/37
5,594,844 A 1/1997 Sakai et al.
5,604,852 A 2/1997 Watters et al.
5,608,850 A 3/1997 Robertson
5,621,906 A 4/1997 O'Neill et al.
5,639,088 A 6/1997 Schneider et al.
5,643,086 A 7/1997 Alcorn et al.
5,678,015 A 10/1997 Goh
5,689,628 A 11/1997 Robertson
5,729,673 A 3/1998 Cooper et al.
5,742,779 A 4/1998 Steele et al.
5,745,109 A * 4/1998 Nakano et al. ................ 715/838
5,755,621 A 5/1998 Marks et al.
5,766,074 A 6/1998 Cannon et al.
5,775,993 A 7/1998 Fentz et al.
5,788,573 A 8/1998 Baerlocher et al.
5,805,783 A 9/1998 Ellson et al.
5,807,172 A 9/1998 Piechowiak
5,833,540 A 11/1998 Miodunski et al.
5,836,819 A 11/1998 Ugawa
5,880,733 A 3/1999 Horvitz et al.
5,903,271 A 5/1999 Bardon et al.
5,912,671 A 6/1999 Oka
5,934,672 A 8/1999 Sines et al.
5,941,772 A 8/1999 Paige
5,956,038 A 9/1999 Rekimoto
5,967,895 A 10/1999 Kellen
5,998,803 A 12/1999 Forrest et al.
6,002,403 A * 12/1999 Sugiyama et al. ............ 715/717
6,002,853 A 12/1999 de Hond
6,005,579 A * 12/1999 Sugiyama et al. ............ 715/855
6,009,458 A * 12/1999 Hawkins et al. .............. 709/203
6,012,984 A 1/2000 Roseman
6,014,142 A * 1/2000 LaHood ........................ 715/848
6,023,371 A 2/2000 Onitsuka et al.
6,027,115 A 2/2000 Griswold et al.
6,029,973 A 2/2000 Takemoto
6,031,545 A * 2/2000 Ellenby et al. ................ 345/632
6,033,307 A * 3/2000 Vancura .......................... 463/20
6,043,818 A * 3/2000 Nakano et al. ................ 715/851
6,050,895 A 4/2000 Luciano et al.
6,057,856 A * 5/2000 Miyashita et al. ............ 345/633
6,062,978 A 5/2000 Martino et al.
6,080,063 A 6/2000 Khosia
6,089,976 A 7/2000 Schneider et al.
6,093,100 A 7/2000 Singer et al.
6,094,196 A 7/2000 Berry et al.
6,104,815 A 8/2000 Alcorn et al.
6,106,396 A 8/2000 Alcorn et al.
6,131,909 A 10/2000 Chilese
6,135,884 A 10/2000 Hedrick et al.
6,149,156 A 11/2000 Feola
6,149,522 A 11/2000 Alcorn et al.
6,159,095 A 12/2000 Frohm et al.
6,183,361 B1 2/2001 Cummings et al.
6,203,009 B1 3/2001 Sines et al.
6,203,428 B1 3/2001 Giobbi et al.
6,206,782 B1 3/2001 Walker et al.
6,220,593 B1 4/2001 Pierce et al.
6,234,901 B1 * 5/2001 Nagoshi et al. ................. 463/33
6,254,483 B1 7/2001 Acres
6,267,669 B1 7/2001 Luciano, Jr. et al.
6,271,842 B1 8/2001 Bardon et al.
6,280,325 B1 8/2001 Fisk
6,287,201 B1 9/2001 Hightower
6,315,666 B1 11/2001 Mastera et al.
6,319,128 B1 * 11/2001 Miyoshi et al. ................. 463/31
6,331,146 B1 12/2001 Miyamoto et al.
6,332,838 B1 12/2001 Yamagami
6,342,892 B1 1/2002 Van Hook et al.
6,346,956 B2 * 2/2002 Matsuda ....................... 715/848
6,347,999 B1 2/2002 Yuan
6,390,470 B1 5/2002 Huang
6,398,218 B1 * 6/2002 Vancura ..................... 273/138.1
6,409,602 B1 6/2002 Wiltshire et al.
6,409,604 B1 * 6/2002 Matsuno ......................... 463/43
6,413,162 B1 7/2002 Baerlocher et al.
6,431,982 B2 * 8/2002 Kobayashi ........................ 463/4
6,454,649 B1 9/2002 Mattice et al.
6,458,032 B1 10/2002 Yamagami
6,506,114 B1 1/2003 Estes et al.
6,508,709 B1 1/2003 Karmarkar
6,512,522 B1 1/2003 Miller et al.
6,515,688 B1 2/2003 Berry et al.
6,517,433 B2 2/2003 Loose et al.
6,524,185 B2 2/2003 Lind
6,533,273 B2 3/2003 Cole et al.
6,537,150 B1 3/2003 Luciano
6,542,168 B2 * 4/2003 Negishi et al. ................ 715/781
6,559,863 B1 * 5/2003 Megiddo ....................... 715/753
6,569,017 B2 5/2003 Enzminger et al.
6,570,587 B1 5/2003 Efrat et al.
6,577,330 B1 * 6/2003 Tsuda et al. .................. 715/782
6,597,358 B2 7/2003 Miller
6,597,380 B1 * 7/2003 Wang et al. ................... 715/782
6,626,760 B1 * 9/2003 Miyamoto et al. .............. 463/33
6,628,310 B1 * 9/2003 Hiura et al. ................... 715/776
6,641,478 B2 11/2003 Sakai
6,645,070 B2 * 11/2003 Lupo ................................ 463/9
6,656,040 B1 12/2003 Brosnan et al.
6,656,044 B1 12/2003 Lewis
6,661,426 B1 12/2003 Jetha et al.
6,667,741 B1 * 12/2003 Kataoka et al. ............... 345/426
6,700,588 B1 * 3/2004 MacInnis et al. ............. 345/629
6,734,884 B1 5/2004 Berry et al.
6,746,329 B1 6/2004 Duhamel
6,760,050 B1 * 7/2004 Nakagawa .................... 715/848
6,769,982 B1 8/2004 Brosnan
6,772,195 B1 * 8/2004 Hatlelid et al. ............... 709/204
6,802,776 B2 10/2004 Lind et al.
6,811,482 B2 11/2004 Letovsky
6,822,662 B1 11/2004 Cook et al.
6,840,858 B2 1/2005 Adams
6,847,162 B2 1/2005 Duggal et al.
6,866,585 B2 3/2005 Muir
6,887,157 B2 5/2005 LeMay et al.
6,902,481 B2 6/2005 Breckner et al.
6,922,815 B2 7/2005 Rosen
6,938,218 B1 8/2005 Rosen
6,942,571 B1 * 9/2005 McAllister et al. ............. 463/20
7,008,324 B1 3/2006 Johnson et al.
7,009,611 B2 3/2006 Di Lelle
7,034,825 B2 4/2006 Stowe et al.
7,070,504 B2 * 7/2006 Iwamoto ......................... 463/20
7,179,166 B1 2/2007 Abbott
7,192,345 B2 3/2007 Muir et al.
7,291,068 B2 11/2007 Bryant et al.
7,318,774 B2 1/2008 Bryant et al.
7,367,885 B2 5/2008 Escalera et al.
7,400,322 B1 7/2008 Urbach
7,465,230 B2 12/2008 LeMay et al.

| | | | | |
|---|---|---|---|---|
| 7,503,003 | B2 * | 3/2009 | Kamen et al. | 715/719 |
| 7,503,006 | B2 * | 3/2009 | Danieli | 715/751 |
| 7,572,186 | B2 | 8/2009 | Lemay et al. | |
| 7,581,195 | B2 | 8/2009 | Sciammarella et al. | |
| 2001/0054794 | A1 | 12/2001 | Cole et al. | |
| 2002/0013170 | A1 | 1/2002 | Miller | |
| 2002/0016201 | A1 | 2/2002 | Bennett et al. | |
| 2002/0019253 | A1 | 2/2002 | Reitzen et al. | |
| 2002/0105515 | A1 | 8/2002 | Mochizuki | |
| 2002/0111208 | A1 | 8/2002 | Marta | |
| 2002/0111212 | A1 | 8/2002 | Muir | |
| 2002/0113369 | A1 | 8/2002 | Weingardt | |
| 2002/0113820 | A1 | 8/2002 | Robinson et al. | |
| 2002/0132661 | A1 | 9/2002 | Lind | |
| 2002/0175466 | A1 * | 11/2002 | Loose et al. | 273/143 R |
| 2003/0013517 | A1 | 1/2003 | Bennett et al. | |
| 2003/0032479 | A1 | 2/2003 | LeMay et al. | |
| 2003/0045345 | A1 | 3/2003 | Berman | |
| 2003/0064781 | A1 | 4/2003 | Muir | |
| 2003/0064801 | A1 | 4/2003 | Breckner et al. | |
| 2003/0119581 | A1 * | 6/2003 | Cannon et al. | 463/25 |
| 2003/0125101 | A1 | 7/2003 | Campo | |
| 2004/0002380 | A1 | 1/2004 | Brosnan | |
| 2004/0029636 | A1 | 2/2004 | Wells | |
| 2004/0048657 | A1 | 3/2004 | Gauselmann | |
| 2004/0077402 | A1 | 4/2004 | Schlottmann | |
| 2004/0077404 | A1 | 4/2004 | Schlottmann et al. | |
| 2004/0092302 | A1 | 5/2004 | Gauselmann | |
| 2004/0102244 | A1 | 5/2004 | Kryuchkov et al. | |
| 2004/0102245 | A1 | 5/2004 | Escalera et al. | |
| 2004/0198485 | A1 | 10/2004 | Loose et al. | |
| 2004/0266515 | A1 | 12/2004 | Gauselmann | |
| 2005/0001845 | A1 | 1/2005 | Noyle | |
| 2005/0075167 | A1 | 4/2005 | Beaulieu et al. | |
| 2005/0225559 | A1 | 10/2005 | Robertson et al. | |
| 2005/0233798 | A1 | 10/2005 | Van Asdale | |
| 2005/0233799 | A1 | 10/2005 | LeMay et al. | |
| 2006/0025199 | A1 | 2/2006 | Harkins et al. | |
| 2006/0229122 | A1 | 10/2006 | Macke | |
| 2006/0287058 | A1 | 12/2006 | Resnick et al. | |
| 2007/0155471 | A1 | 7/2007 | Powell et al. | |
| 2007/0155472 | A1 | 7/2007 | Gail et al. | |
| 2008/0045331 | A1 | 2/2008 | LeMay et al. | |
| 2008/0188304 | A1 | 8/2008 | Escalera et al. | |
| 2008/0303746 | A1 | 12/2008 | Schlottmann et al. | |
| 2009/0062001 | A1 | 3/2009 | LeMay et al. | |

FOREIGN PATENT DOCUMENTS

| | | | |
|---|---|---|---|
| AU | 200210214 | | 8/2002 |
| AU | 200227720 | | 2/2003 |
| AU | 2003237479 | B2 | 1/2004 |
| AU | 2006203556 | B2 | 9/2006 |
| CA | 2 343 870 | | 10/2001 |
| EP | 0 475 581 | | 3/1992 |
| EP | 0 759 315 | | 2/1997 |
| EP | 0 830 881 | | 3/1998 |
| GB | 2 405 107 | | 2/2005 |
| GB | 2 412 282 | | 9/2005 |
| GB | 2 420 294 | | 5/2006 |
| GB | 2 459 628 | | 11/2009 |
| GR | 62140 | B | 8/1979 |
| JP | 2002-099926 (A) | | 4/2002 |
| RU | 2 067 775 | C1 | 10/1996 |
| RU | 2 168 192 | C2 | 5/2001 |
| WO | WO 98/45004 | | 10/1998 |
| WO | WO 02/32521 | | 4/2002 |
| WO | WO 02/073501 | | 9/2002 |
| WO | WO 2004/002591 | | 1/2004 |
| WO | WO 2004/028650 | | 4/2004 |
| WO | WO 2004/029893 | | 4/2004 |
| WO | WO 2005/016473 | | 2/2005 |
| WO | WO 2005/034054 | | 4/2005 |
| WO | WO 2006/039324 | | 4/2006 |
| WO | WO 2008/005278 | | 1/2008 |
| WO | WO 2008/154433 | | 12/2008 |

OTHER PUBLICATIONS

Carson G. S.: "Standards Pipeline the OpenGL Specification" Computer Graphics, ACM, US, vol. 31, No. 2, May 1997, pp. 17-18, XP000969297, ISSN: 097-8930.

Mason Woo, Jackie Neider, Tom Davis, Dave Shreiner, OpenGL Program Guide: The Official Guide to Learning OpenGL, Introduction to OpenGL Chapter 1, Version 1.2, 3.sup.rd edition, Open GL Architecture Review Board, Addison-Wesley Publishing, Co., 1999, ISBN: 0201604582

"White Paper", Power VR (PowerVR), 3D Graphical Processing, Nov. 14, 2000, Copyright Power VR 2000 8 pages.

M2 Presswire, "Aristocrat Technologies to use PowerVR Technology in Casino Video Machines; Australian Company Leads Market for Video Machine Games of Chance", Oct. 17, 2000, http://www.aristocrat.com.au/PR181000.htm, Copyright 2000 M2 Communications Ltd. printed on Jul. 3, 2001 pp. 1-2.

David Einstein, "3D Web Browsing on the Horizon", Forbes.com Nov. 27, 2000, available at http://www.forbes.com/2001/11/27/1127thread.html. pp. 1-2.

GameSpot Staff. "15 Most Influential Games of All Time" Gamespot [online ], retrieved May 30, 2007]. Retrieved from the Internet <http://web.archive.org/web/20010618175937/http://gamespot.com/gamespot/features/pc/most_influential/p16.html >.

"3D Modelers Are Running under Linux" LinuxFocus: vol. Nr 4, May 1998 http://mercury.chem.pitt.edu/~tiho/LinuxFocus/English/May1998/index.html printed on Oct. 11, 2002.

Phillip Ross, "Hardware Review: 3Dfx Graphics Card" LinuxFocus vol. 2, pp. 1-7 http://mercury.chem.pitt.edu/~tiho/LinuxFocus/English/January1998/artilce18.ht printed on Oct. 11, 2002.

"Learn How to Program 3D Graphics" LinuxFocus vol. NR 2, Jan. 1998 1-2 pages. http://mercury.chem.pitt.edu/~tiho/LinuxFocus/English/January1998/index/html.

Miguel Angel Sepulveda, "Open GL Programming: The 3D Scene" pp. 1-7 http://mercury.chem.pitt.edu/~tiho/LinuxFocus/English/May1998/article46.html.

Miguel Angel Sepulveda, "What is OpenGL?" LinuxFocus vol. 2 pp. 1-5 http://mercury.chem.pittedu/~tiho/LinuxFocus/English/January1998/article15.html printed on Oct. 11, 2002.

"TE 5 Graphics Accelerator Technology Preview" NEC Aug. 2001, 7 pages.

"A Primer form Mercury Research The Basics of 3D Graphics Technology" The Meter available at http://www.themeter.com/artilces/3DBasics.shtml printed on Jan. 31, 2003 pp. 1-2.

"The Basics of 3D: Tackling the Pipeline", The Meter, available at http://www.themeter.com/articles/3DBasics-2.shtml, printed on Jan. 31, 2003 pp. 1-2.

"The Basics of 3D: Balancing the Pipeline", The Meter, available at http://www.themeter.com/articles/3DBasics-3.shtml, printed on Jan. 31, 2003 pp. 1-2.

"The Basics of 3D: Adding Parallelism", The Meter, available at http://www.themeter.com/articles/3DBasics-4.shtml, printed on Jan. 31, 2003 pp. 1-2.

"The Basics of 3D: What's Next", The Meter, available at http://www.themeter.com/articles/3DBasics-5.shtml, printed on Jan. 31, 2003 p. 1.

"The Basics of 3D: Transform and Lighting", The Meter, available at http://www.themeter.com/articles/3DBasics-6.shtml, printed on Jan. 31, 2003 pp. 1-2.

"The Basics of 3D: The Next Generation", The Meter, available at http://www.themeter.com/articles/3DBasics-7.shtml, printed on Jan. 31, 2003 pp. 1-2.

Scott et al. "An Overview of the Visualize fx Graphics Accelerator Hardware" Article 4 Hewlet Packard Company May 1998 HP Journal.

"Pattern Display Device," Patent Abstracts of Japan, Publication No. 2002-085624, published Mar. 26, 2002.

"Game Machine," Patent Abstracts of Japan, Publication No. 2001-252394, published Sep. 18, 2001.

"Game Machine," Patent Abstracts of Japan, Publication No. 2001-252393, published Sep. 18, 2001.

"Slot Machine," Patent Abstracts of Japan, Publication No. 2001-062032, published Mar. 13, 2001.

Segal et al., "The OpenGL Graphics System: A Specification (Version 1.3)", 2001, printed from http://www.opengl.org/documentation/specs/version1.3/glspec13.pdf, pp. 1-11, 66-73 and 181-189 (29 pages).
Rose, "Nevada A.G. Finds Free Internet Gambling is Still Gambling", Mar. 2001, printed from http://rose.casinocitytimes.com/articles/974.html, pp. 1-4.
Segal et al., "The OpenGL Graphics System: A Specification (Version 1.3)", 2001, printed from http://www.opengl.org/documentation/specs/version1.3/glspec13.pdf, pp. 1-11, 66-73 and 181-189 (40 pages).
Bienvenue et al., U.S. Appl. No. 11/312,966, "Bingo System with Downloadable Common Patterns", filed Dec. 19, 2005.
Powell et al., U.S. Appl. No. 11/312,948, "Bingo Gaming Machine Capable of Seclecting Different Bingo Pools", filed Dec. 19, 2005.
Gail et al., U.S. Appl. No. 11/402,726, "Using Multiple Bingo Cards to Represent Multiple Slot Paylines and Other Class III Game Options", filed Apr. 11, 2006.
Powell et al., U.S. Appl. No. 11/442,029, "Bingo System with Discrete Payout Categories", filed May 26, 2006.
Examination Report dated Jun. 3, 2009 from European Application No. 07809991.8.
Examination Report dated May 14, 2009 from British Application No. GB0505328.5.
Examination Report dated Feb. 16, 2009 from Australian Application No. 2003279092.
Examination Report dated Feb. 6, 2009 from Australian Application No. 2003279742.
Final Office Action dated Oct. 1, 2009 from U.S. Appl. No. 10/803,233.
U.S. Office Action dated Jun. 13, 2003 issued in U.S. Appl. No. 09/927,901.
U.S. Final Office Action dated Dec. 22, 2003 issued in U.S. Appl. No. 09/927,901.
U.S. Examiner Interview Summary dated Mar. 16, 2004 issued in U.S. Appl. No. 09/927,901.
U.S. Office Action dated Jun. 21, 2004 issued in U.S. Appl. No. 09/927,901.
U.S. Examiner Interview Summary dated Jul. 27, 2004 issued in U.S. Appl. No. 09/927,901.
U.S. Notice of Allowance dated Dec. 16, 2004 issued in U.S. Appl. No. 09/927,901.
U.S. Office Action dated Dec. 10, 2007 issued in U.S. Appl. No. 11/112,076.
U.S. Notice of Allowance dated Sep. 15, 2008 issued in U.S. Appl. No. 11/112,076.
U.S. Office Action dated Dec. 12, 2007 issued in U.S. Appl. No. 11/829,807.
US Notice of Allowance dated Sep. 8, 2008 issued in U.S. Appl. No. 11/829,807.
U.S. Office Action dated Mar. 15, 2010 issued in U.S. Appl. No. 12/264,877.
U.S. Notice of Allowance dated Aug. 16, 2010 issued in U.S. Appl. No. 12/264,877.
U.S. Office Action dated Aug. 18, 2010 issued in U.S. Appl. No. 11/481,666.
U.S. Office Action dated May 15, 2009 issued in U.S. Appl. No. 10/187,343.
U.S. Final Office Action dated May 10, 2010 issued in U.S. Appl. No. 10/187,343.
U.S. Notice of Allowance dated Aug. 6, 2010 issued in U.S. Appl. No. 10/187,343.
U.S. Office Action dated Sep. 6, 2007 issued in U.S. Appl. No. 10/803,233.
U.S. Office Action dated Jun. 24, 2008 issued in U.S. Appl. No. 10/803,233.
U.S. Office Action dated Jan. 23, 2009 issued in U.S. Appl. No. 10/803,233.
U.S. Notice of Allowance dated Jan. 27, 2010 issued in U.S. Appl. No. 10/803,233.
U.S. Notice of Allowance dated Mar. 11, 2010 issued in U.S. Appl. No. 10/803,233.
U.S. Notice of Allowance dated Jul. 12, 2010 issued in U.S. Appl. No. 10/803,233.
U.S. Office Action dated Jun. 12, 2007 issued in U.S. Appl. No. 10/674,884.
U.S. Office Action dated Feb. 20, 2008 issued in U.S. Appl. No. 10/674,884.
U.S. Action - Examiner's Answer re Brief on Appeal, dated Jun. 22, 2009 issued in U.S. Appl. No. 10/674,884.
U.S. Action - Examiner's Communication re IDS Considered dated Jul. 27, 2009 issued in U.S. Appl. No. 10/674,884.
U.S. Office Action dated Feb. 12, 2007 issued in U.S. Appl. No. 10/676,719.
U.S. Notice of Allowance dated Sep. 24, 2007 issued in U.S. Appl. No. 10/676,719.
U.S. Office Action dated May 18, 2010 issued in U.S. Appl. No. 12/101,921.
U.S. Office Action dated Aug. 25, 2010 issued in U.S. Appl. No. 11/759,825.
U.S. Office Action dated Feb. 8, 2005 issued in U.S. Appl. No. 10/272,788.
U.S. Office Action dated May 25, 2005 issued in U.S. Appl. No. 10/272,788.
U.S. Office Action dated Jun. 1, 2006 issued in U.S. Appl. No. 10/272,788.
U.S. Office Action dated Oct. 26, 2006 issued in U.S. Appl. No. 10/272,788.
U.S. Office Action dated Feb. 22, 2007 issued in U.S. Appl. No. 10/272,788.
Australian Examiner's first report dated Nov. 21, 2005 issued in AU Patent Application No. 27720/02.
Australian Examiner's first report dated Jun. 26, 2008 from AU Application No. 2006203556.
PCT International Search Report and Written Opinion dated Feb. 12, 2008 issued in PCT Application No. PCT/US2007/015015, 15 pages.
PCT International Preliminary Report on Patentability and Written Opinion dated Jan. 6, 2009 issued in PCT Application No. PCT/US2007/015015.
EP Result of Consultation dated Sep. 1, 2009 issued in Application No. 07 809 991.8-2221.
PCT International Search Report dated Jan. 13, 2004 from related PCT Application No. PCT/US2003/018028.
Australian Examiner's first report dated Jun. 18, 2008 in Application No. 2003237479.
Australian Examiner's first report dated Mar. 12, 2010 issued in Application No. 2005201148.
Australian Examiner's Report No. 2 dated Aug. 10, 2010 issued in Application No. 2005201148.
UK Search Report under Section 17(5) dated Jun. 22, 2005 issued in GB 0505328.5.
British Examination Report dated Dec. 9, 2009 from Application No. GB 0505328.5.
PCT International Search Report dated Mar. 1, 2004 issued in PCT/US2003/031138.
European Office Action dated Nov. 24, 2005 issued in EP Application No. 03 770 604.1-1238, 4 pages.
Russian Office Action dated Jul. 19, 2007 issued in RU Application No. 2005109160/09 (010839), 9 pages.
PCT International Search Report dated Mar. 19, 2004 issued in PCT Application No. PCT/US2003/031158.
European Examination Report dated Dec. 15, 2005 issued in EP Application No. 03 773 084.3-2218.
European Office Action dated Jun. 29, 2007 issued in EP Application No. 03 773 084.3-2218, 3 pages.
Russian Advisory Action dated Jul. 19, 2007 from related Russian Application No. 2005109161/09 (010840) 7 pages.
PCT International Search Report and Written Opinion dated Oct. 24, 2008 issued in PCT/US2008/066196.
PCT International Preliminary Report on Patentability and Written Opinion dated Dec. 7, 2009 issued in PCT/US2008/066196.
"PowerVR Technologies Debuts KYRO II SE Graphics Proecssor at CeBIT 2002", Tech/Zone, Mar. 13, 2002, available at http://www.techzone.pcvsconsole.com/news.php?tzd=1246.
U.S. Notice of Allowance dated Nov. 1, 2010 issued in U.S. Appl. No. 12/264,877.

U.S. Notice of Allowance dated Nov. 30, 2010 issued in U.S. Appl. No. 10/187,343.
U.S. Notice of Allowance and Examiners Communication dated Nov. 3, 2010 issued in U.S. Appl. No. 10/803,233.
U.S. Office Action Final dated Oct. 29, 2010 issued in U.S. Appl. No. 12/101,921.

* cited by examiner

FIG. 13
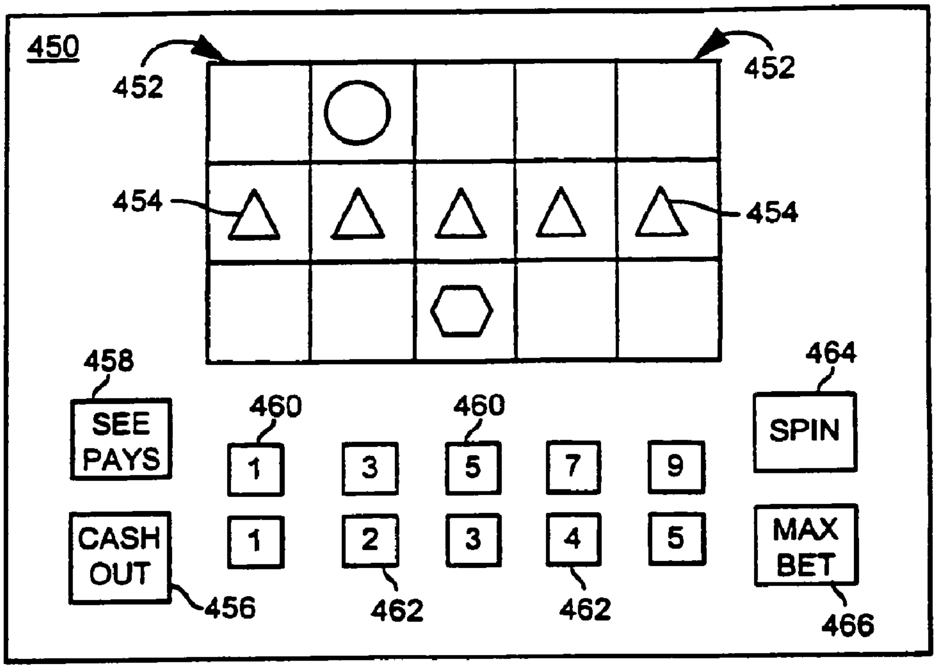
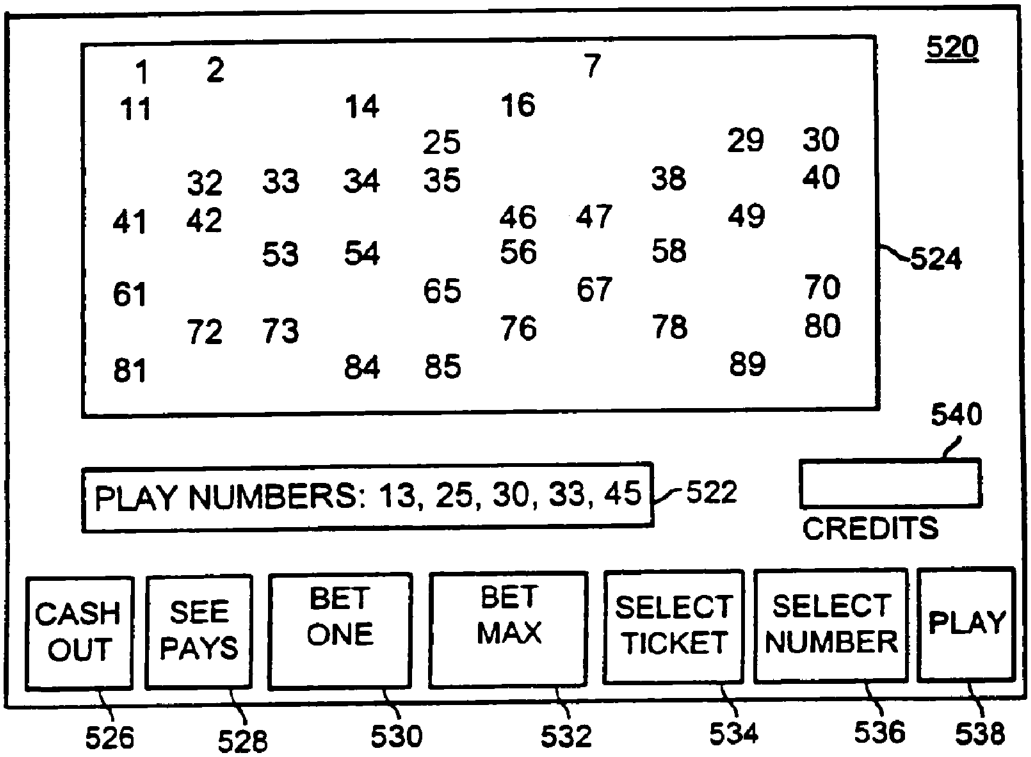
FIG. 14

TRANSPARENT OBJECTS ON A GAMING MACHINE

CROSS REFERENCES TO RELATED APPLICATIONS

This application is related to the following commonly-owned, co-pending patent applications:

U.S. patent application Ser. No. 10/272,854 entitled "Displaying Paylines on a Gaming Machine," filed on Oct. 17, 2002; and U.S. patent application Ser. No. 10/273,378 entitled "Payline Curves on a Gaming Machine," filed on Oct. 17, 2002.

These applications are hereby incorporated by reference, in their entirety, for all purposes.

This application is a continuation-in-part of U.S. patent application Ser. No. 11/112,076, entitled "VIRTUAL CAMERAS AND 3-D GAMING ENVIRONMENTS IN A GAMING MACHINE" and filed Apr. 22, 2005, now U.S. Pat. No. 7,465,230 which is a continuation of U.S. patent application Ser. No. 09/927,901, entitled "VIRTUAL CAMERAS AND 3-D GAMING ENVIRONMENTS IN A GAMING MACHINE" and filed Aug. 9, 2001 (now issued as U.S. Pat. No. 6,887,157.

This application is a continuation of U.S. patent application Ser. No. 10/272,788, entitled, "Transparent Objects on a Gaming Machine," by Schlottmann, et al., and filed Oct. 17, 2002, now abandoned which is incorporated herein in its entirety and for all purposes.

BACKGROUND

The present disclosure is related to presenting games on gaming machines such as reel-type slot machines, video poker machines, etc.

Various presentation techniques for gaming machines have been previously described. For example, U.S. Pat. No. 5,788,573 to Baerlocher et al. describes a computer-implemented electronic game. A gaming terminal is configured to display a screen with a number of areas including a puzzle completion area and a slot machine area. The slot machine area includes a number of simulated slot machine reels. In one example, multiple symbols on multiple reels are displayed. In this example, multiple possible paylines are provided. Payline indicators are displayed to indicate the various paylines. In one example, a payline indicator includes a number indicative of the payline, and a lighted portion adjacent to the symbol positions included in the payline.

U.S. Pat. No. 6,050,895 to Luciano, Jr. et al. describes a gaming device for a hybrid game including a coordination/dexterity portion and/or a traditional game portion. A screen that may be displayed on a display device includes a plurality of screen portions. In one portion, a representation of a golf course is displayed in connection with a simulated golf game. In another portion, a traditional game such as an electronic slot machine game is depicted.

Miguel A. Sepulveda, "What is OpenGL?," LinuxFocus, Vol. 2 (January 1998) describes an application programming interface, known as "OpenGL," for developing three dimensional (3D) graphical applications. With OpenGL, a programmer may construct mathematical descriptions of objects, and arrange the objects in a 3D scene. Additionally, the programmer can select a desired vantage point for viewing the scene, provide lighting to the scene, and color to the objects. Additionally, the programmer can use "texture mapping" to render images of realistic looking surfaces on to objects in the 3D scene.

SUMMARY

In one embodiment, a gaming apparatus is provided. The gaming apparatus may comprise a display unit, a value input device, and a controller operatively coupled to the display unit and the value input device. The controller may comprise a microprocessor and a memory operatively coupled to the microprocessor. The controller may be configured to generate a representation of a game display in a three dimensional (3D) graphics space, and to convert a view of the 3D graphics space into display data for display on the display unit, the view including the game display. The controller may also be configured to cause the display unit to display the display data, the display data including the view of the 3D graphics space, and to allow a person to make a wager. The controller may additionally be configured to cause the display unit to display a secondary display, the secondary display overlapping, at least in part, the game display, wherein the secondary display appears at least partially transparent.

In another embodiment, another gaming apparatus is provided. The gaming apparatus may comprise a display unit, a value input device, and a controller operatively coupled to the display unit and the value input device. The controller may comprise a microprocessor and a memory operatively coupled to the microprocessor. The controller may be configured to allow a person to make a wager, and to generate a representation of a game display on a first plane in a three dimensional (3D) graphics space. The controller may additionally be configured to generate display data for the display unit, the display data corresponding to a view in the 3D graphics space, and to determine, after the display data has been displayed, a value payout associated with an outcome of the game represented by the display data. The controller may also be configured to cause the display unit to display a secondary display, the secondary display overlapping, at least in part, the game display, wherein the secondary display appears at least partially transparent.

In a further embodiment, still another gaming apparatus is provided. The gaming apparatus may comprise a display unit, a value input device, and a controller operatively coupled to the display unit and the value input device. The controller may comprise a microprocessor and a memory operatively coupled to the microprocessor. The controller may be configured to generate a representation of a game display in a three dimensional (3D) graphics space, the game display corresponding to a game, and to cause the display unit to display a view of the game display in the 3D graphics space. The controller may also be configured to allow a person to make a wager, and to determine the outcome of the game. The controller may additionally be configured to determine a value payout associated with the outcome of the game, and to cause the display unit to display a secondary display, the secondary display overlapping, at least in part, the view of the game display, wherein the secondary display appears at least partially transparent.

In yet another embodiment, a gaming method is provided. The gaming method may comprise generating a representation of a game display in a three dimensional (3D) graphics space, and converting a view of the representation of the game display into display data for display on a display unit. The gaming method may additionally comprise determining a value payout associated with an outcome of associated with the game display, and displaying a secondary display on the display unit, the secondary display overlapping, at least in part, the view of the game display, wherein the secondary display appears at least partially transparent.

In still another embodiment, a memory having a computer program stored therein is provided, the computer program being capable of being used in connection with a gaming apparatus. The memory may comprise a first memory portion physically configured in accordance with computer program instructions that would cause the gaming apparatus to allow a person to make a wager, and a second memory portion physically configured in accordance with computer program instructions that would cause the gaming apparatus to convert a view of a three dimensional (3D) graphics space into display data for display on a display unit, the 3D graphics space including a representation of a game. The memory may also comprise a third memory portion physically configured in accordance with computer program instructions that would cause the gaming apparatus to display the display data on the display unit, and a fourth memory portion physically configured in accordance with computer program instructions that would cause the gaming apparatus to determine a value payout associated with an outcome of a game corresponding to the game display. The memory may further comprise a fifth memory portion physically configured in accordance with computer program instructions that would cause the gaming apparatus to display a secondary display on the display unit, the secondary display overlapping, at least in part, the view of the game display, wherein the secondary display appears at least partially transparent.

In yet another embodiment, a gaming apparatus is provided. The gaming method may comprise a display unit, a value input device, and a controller operatively coupled to the display unit and the value input device. The controller may comprise a microprocessor and a memory operatively coupled to the microprocessor. The controller maybe configured to cause the display unit to display a game display, and to allow a person to make a wager. The controller may additionally be configured to cause the display unit to display a secondary display, the secondary display overlapping, at least in part, the game display, wherein the secondary display appears at least partially transparent.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 13 is an illustration of an embodiment of a visual display that may be displayed during performance of the slots routine of FIG. 15;

FIG. 14 is an illustration of an embodiment of a visual display that may be displayed during performance of the video keno routine of FIG. 16;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
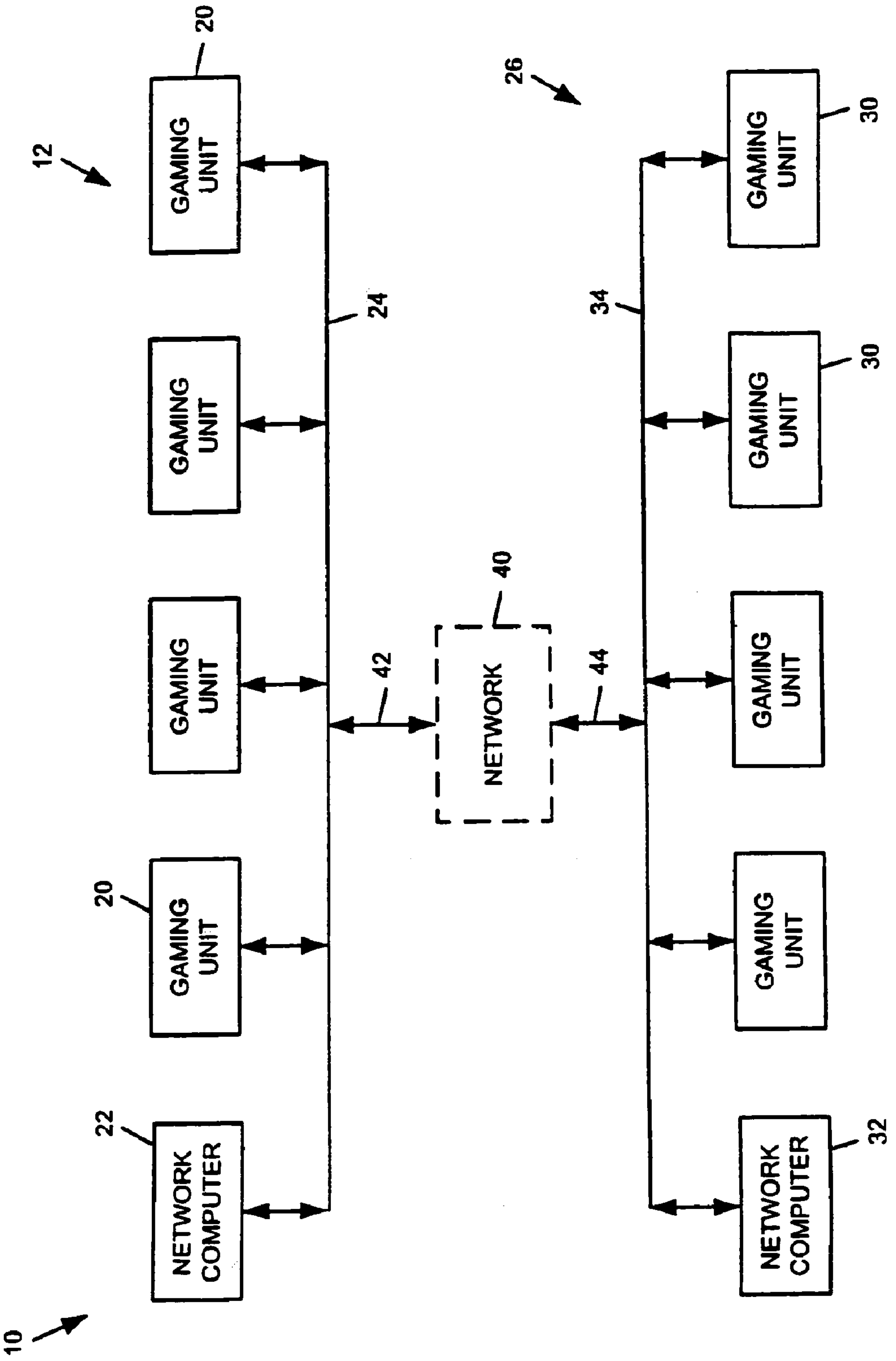
FIG. 1 is a block diagram of an embodiment of a gaming system.

FIG. 1 illustrates one possible embodiment of a casino gaming system 10 in accordance with the invention. Referring to FIG. 1, the casino gaming system. 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Figure 2:
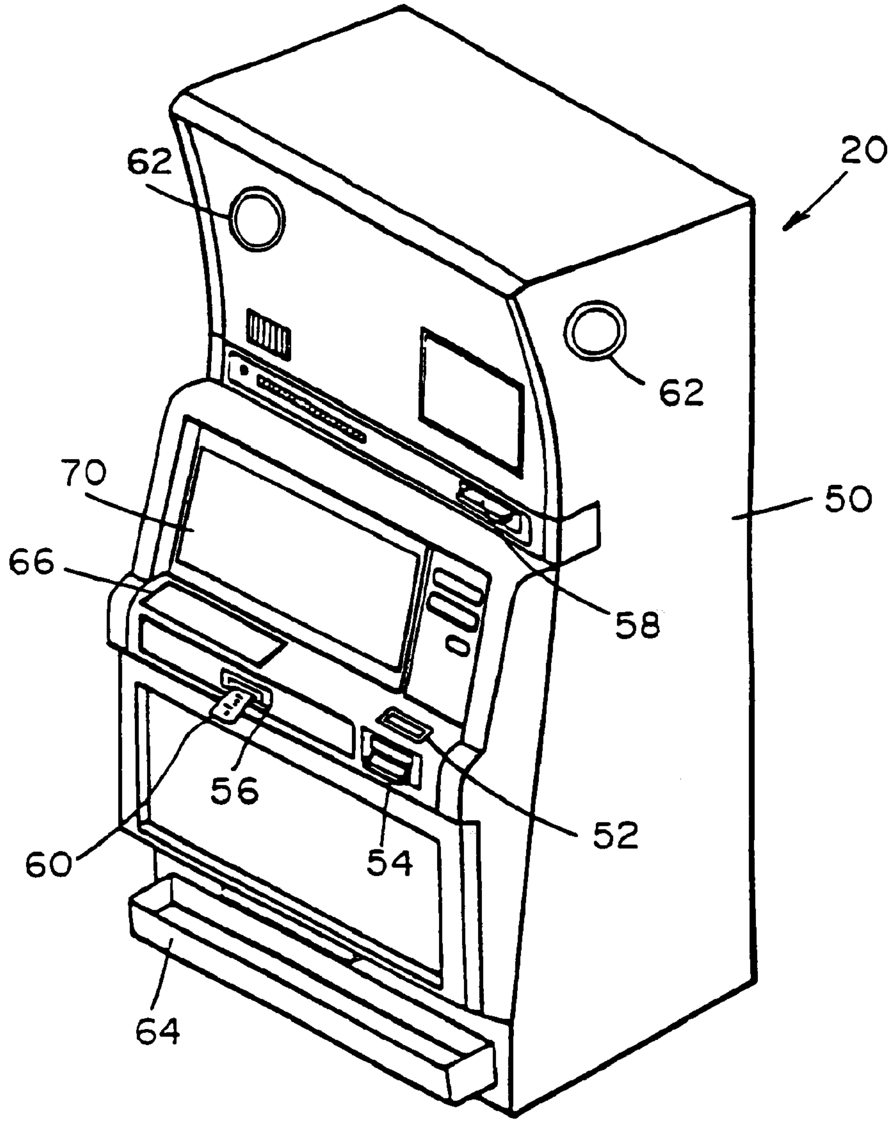
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, and any other object representative of value.

If provided on the gaming unit 20, the ticket reader/printer 56 maybe used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66 and a display unit 70 for displaying display data relating to the game or games provided by the gaming unit 20. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc. The display unit 70 may be two dimensional display unit such as a color video display unit displaying images. Additionally, the display unit 70 may include a three dimensional display unit such as a holographic display, a stereoscopic display, a three dimensional display volume, etc.

Figure 2A:
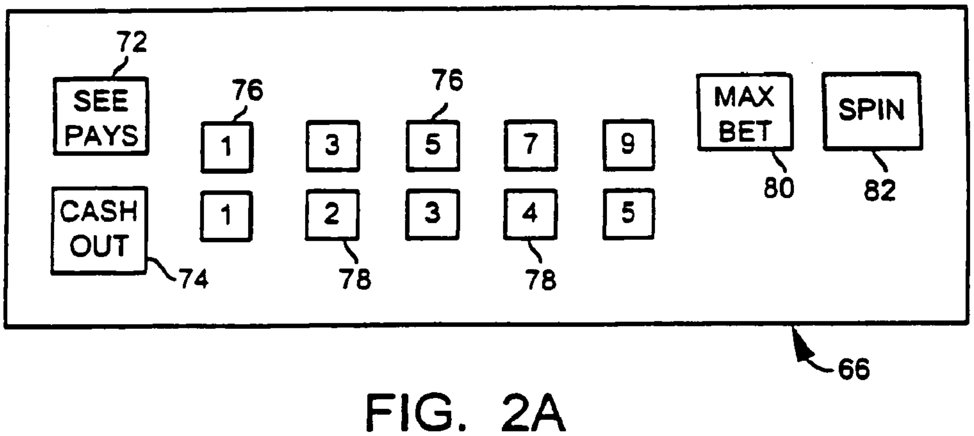
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
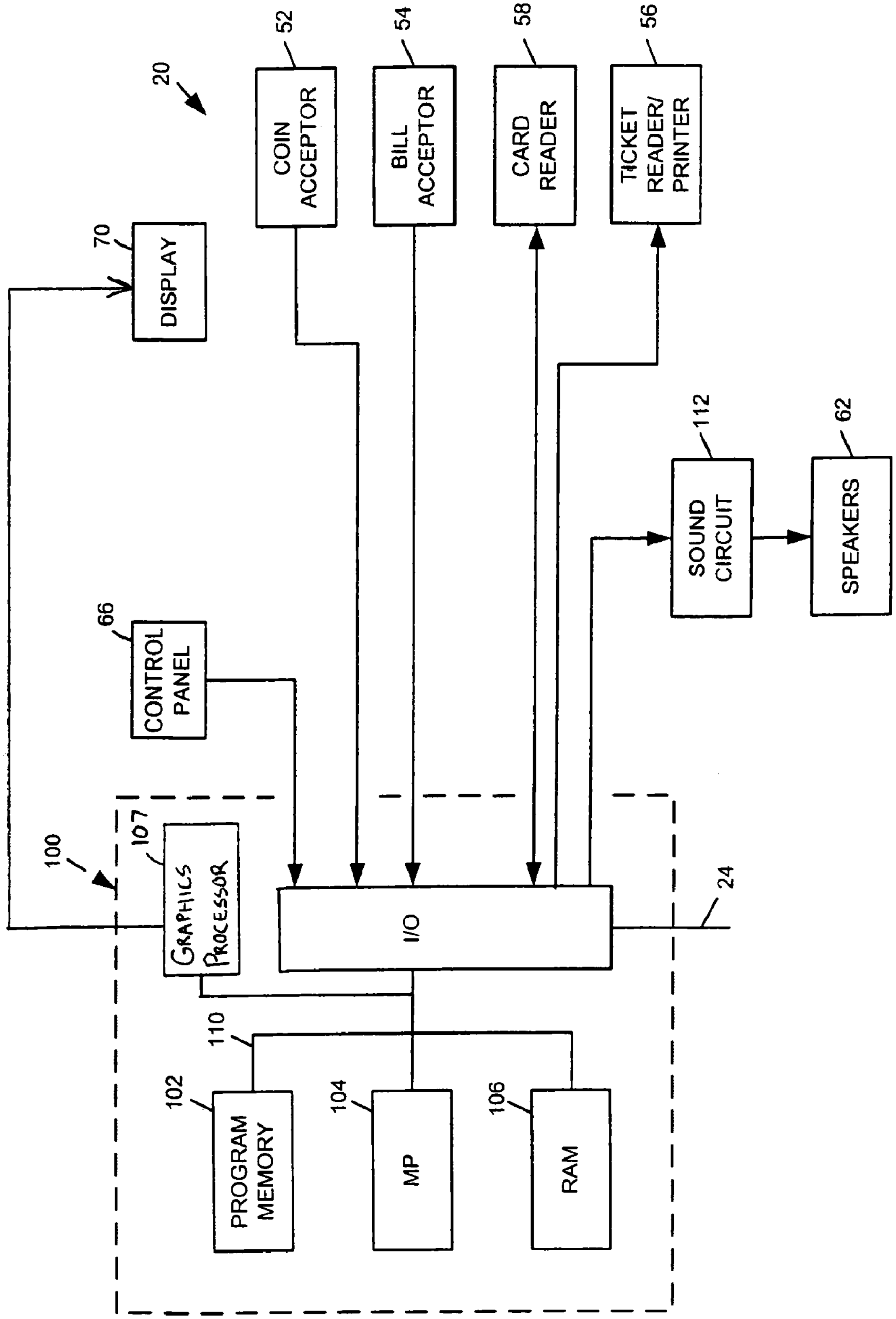
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106, a graphics processor 107, and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the coin acceptor 52, the bill acceptor 54, the card reader 58, the ticket reader/printer 56 and a graphics processor 107 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

The graphics processor 107 may be a processor, such as a conventional graphics processor, configured to convert graphical primitives into display information that can be shown on the display unit 120. Graphical primitives may include, for example, points, lines, polygons, etc. The graphics processor 107 maybe a KYRO II® or KYRO III® graphics and video accelerator commercially available from STMICROELECTRONICS®, Inc, a GEFORCE2® graphics processing unit commercially available from NVIDIA® Corporation, a RADEON® 7000 graphics processor commercially available from ATI Technologies Inc., etc.

Although the microprocessor 104 and the graphics processor 107 are shown as separate devices in FIG. 3, it should be noted that such a representation is merely exemplary and that the functionality of both devices could be incorporated into a single device. For example, the microprocessor could perform some or all of the operations carried out by the graphics processor 107.

3D Graphics Overview

In a system employing 3D graphics, a scene to be displayed may be composed in a 3D model space (also referred to herein as "3D graphics space"). The scene may include a plurality of 3D objects. These 3D objects may be composed of a plurality of geometric primitives that help define the object's surface. Such primitives may include, for instance, points, lines, polygons, etc. As an example, the OpenGL graphics application programming interface, promulgated by OpenGL Architecture Review Board, provides various types of primitives that may be employed such as points, lines, line strips, line loops, polygons, quadrilaterals, polygon strips, triangles, triangle strips, and triangle fans.

A 3D cube may comprise, for example, of six quadrilateral primitives, corresponding to the six surfaces of the cube. A polygon that is extensively used in typical 3D graphics systems is the triangle. Thus, as another example, the 3D cube may comprise 12 triangle primitives, where each of the six surfaces of the cube comprises two triangles. By using an appropriate number of primitives, such as triangles, objects may be made to appear round, spherical, tubular, etc. Complex objects, such as a human body, may be composed of numerous primitives.

Primitives in the 3D model space may be indicated by the coordinates of their vertices. For example, a point may be indicated by its 3D coordinates. Also, a line may be indicated by two sets of 3D coordinates corresponding to its two endpoints. Similarly, a triangle may be indicated by three sets of 3D coordinates corresponding to its three comers. Primitives in the 3D model space may also be indicated by a primitive type (e.g., point, line, triangle, quadrilateral, etc.). The 3D model space may be described using a rectangular coordinate system or another coordinate system such as a spherical coordinate system or a cylindrical coordinate system.

Attributes may be assigned to objects or primitives in the 3D model space. Attributes may include color, pattern, reflectance, transparency, translucency, animation, texture, etc. Textures may include smoothness, surface irregularities such as bumps, craters, etc., and may also include the mapping of text, an image, bitmap, animation, video, etc., onto the object or primitive.

Figure 4:
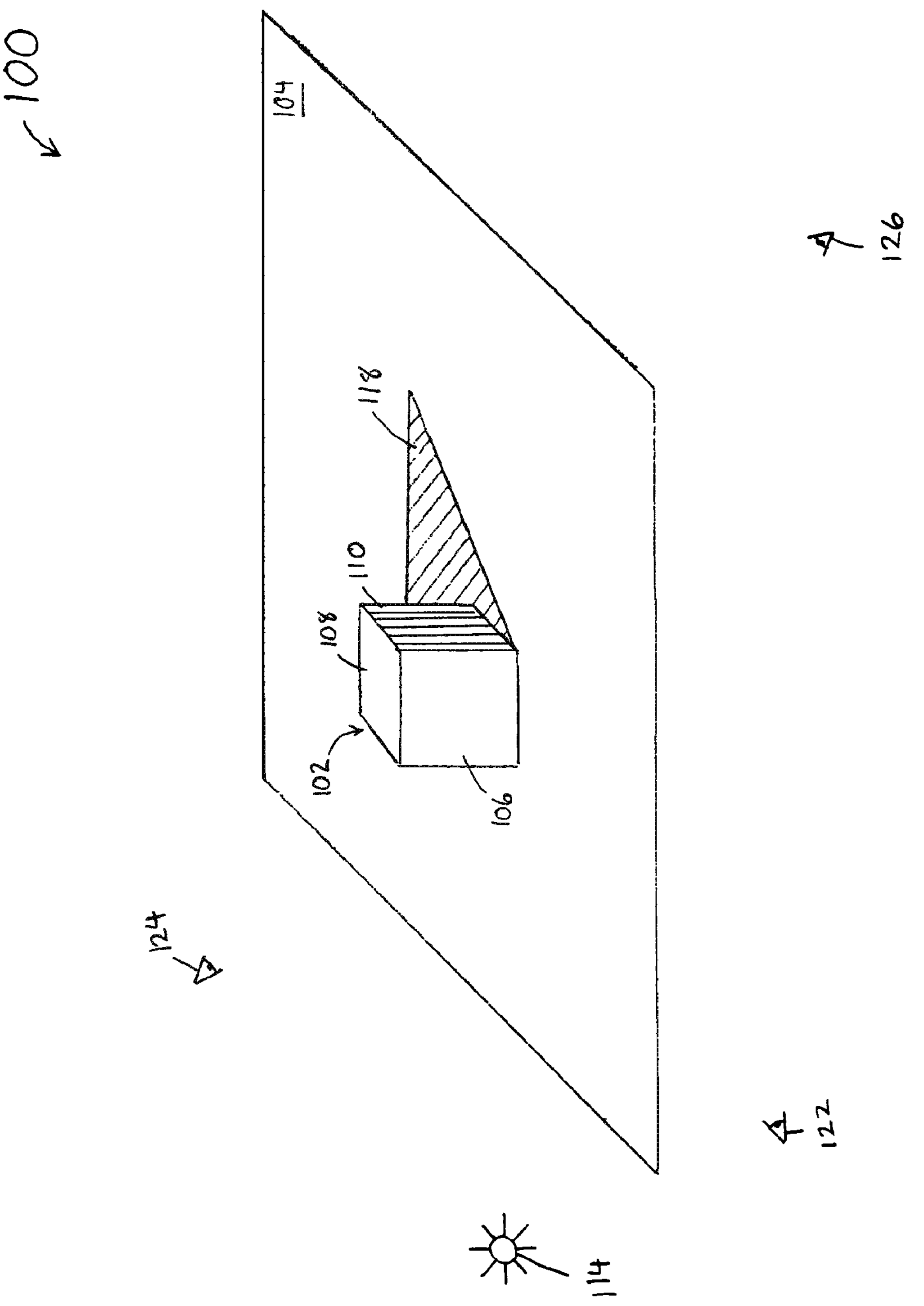
FIG. 4 is an illustration of objects in a 3-dimensional model space.

FIG. 4 is an illustration of an example of objects in a model space. The model space 100 includes a cube 102 on a plane 104. The cube 102 comprises surface polygons 106, 108, and 110. Model space 100 also includes a light source 114, which causes cube 102 to cast a shadow 118 onto plane 104. The shadow 118 may be represented as one or more 3D primitives having a darker shade. Additionally, polygon 110 is not illuminated by light source 114, and therefore may appear shaded.

Model space 100 can be viewed from various viewpoints such as viewpoints 122, 124, and 126. To display a depiction of model space 100 on a display unit, a view point maybe chosen, and a depiction of the model space 100 as viewed from that viewpoint may be generated.

Figure 5A:
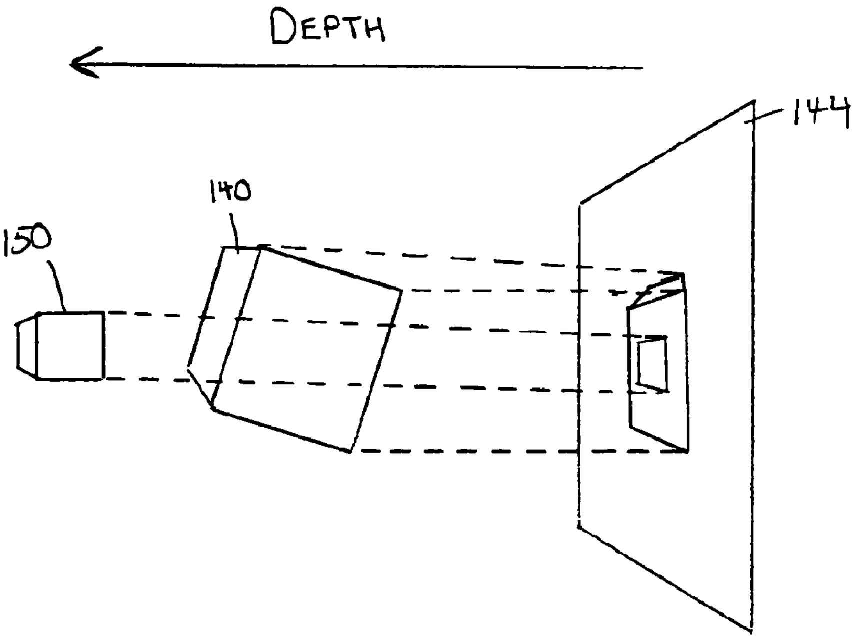
FIGS. 5A and 5B illustrations of objects in a 3-dimensional model space being projected onto a 2-dimensional virtual display.
Figure 5B:
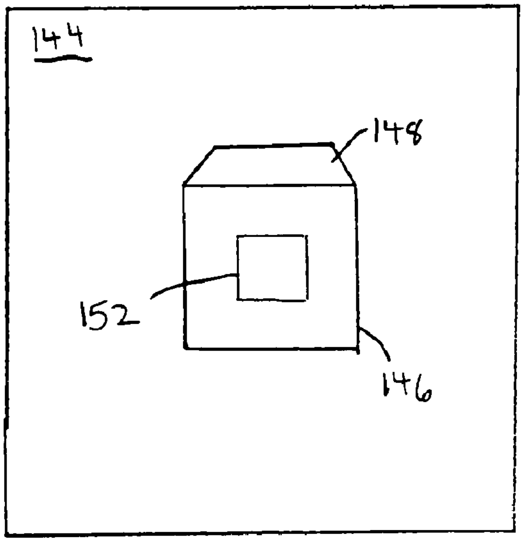

A typical technique for generating a depiction of the model space 100 from a particular viewpoint is to "project" the model space 100 onto a virtual display. For example, if the viewpoint is to be viewed on a 2D display such as a monitor, the model space 100 (or a portion thereof) may be "projected" onto a virtual 2D display. FIGS. 5A and 5B illustrate an example of objects 140 and 150 in 3D model space being "projected" onto a virtual 2D display 144. Typically, the projection of an object in 3D model space onto a 2D virtual screen is implemented by "projecting" 3D primitives of which it is comprised. Typically, a mathematical transform is applied to the 3D coordinates of each primitive's vertices to generate the 2D coordinates of the projection's vertices on the virtual 2D display 144. Thus, application of the mathematical transform may generate primitives in a 2D space (hereinafter "2D primitives"). Additional computations may be performed to generate the effects of light sources, if any, in 3D space on the color, luminance, etc., associated with the generated 2D primitives. These mathematical transformations may be included in a 3D graphics processing step typically known to those of ordinary skill in the art as "Transform and Lighting." FIG. 8B illustrates the projection of cube 140 onto the virtual display 144. In this example, the projection comprises two polygons 146 and 148. Because the virtual display 144 is a 2D space, polygons 146 and 148 can be indicated by sets of 2D coordinates.

The Transform and Lighting processing step generally may produce data including information relating to 2D primitives. This data relating to a 2D primitive may include the 2D coordinates of its vertices, the primitive's color, luminance, etc.

The data may also include depth information of the primitive in terms of the 3D model space and the viewpoint. This depth information can help determine whether a particular primitive, or part of the primitive, is blocked from view by another primitive. Referring again to FIGS. 5A and 5B, depth may increase going "into" the 3D space from the virtual display 144. Thus, object 150 maybe at a greater depth than object 140. Similarly, the depth information associated with projected polygon 152 may indicate a greater depth than that of polygons 146 and 148. Therefore, if object 140 is opaque, polygon 152 is hidden and may not be displayed on the display unit.

The data relating to a 2D primitive may also include transparency information, such as a value that indicates the degree of transparency of the primitive. In some typical 3D graphic systems, a primitive's "alpha value" indicates the degree of the primitive's transparency. Frequently, the alpha value may be between the values 0 and 1, inclusive, where, for example, a 0 indicates the primitive is completely transparent and a 1 indicates the primitive is completely opaque. In other 3D graphics systems, the transparency information, may merely include a flag that indicates whether or not the primitive is transparent, and the degree of transparency is the same for all transparent primitives. For example, the degree of transparency may be fixed at 50% for transparent objects. In 3D graphics systems that employ "alpha values," a technique often referred to as "alpha blending" may be used to generate a display in which an object appears to be transparent when viewed on the display unit.

Figure 6A:
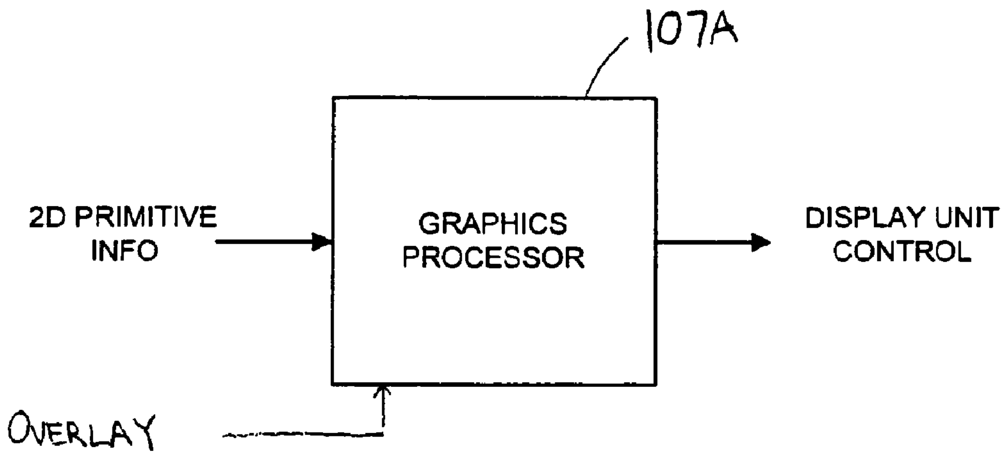
FIGS. 6A and 6B are block diagrams of embodiments of a graphics processor.
Figure 6B:
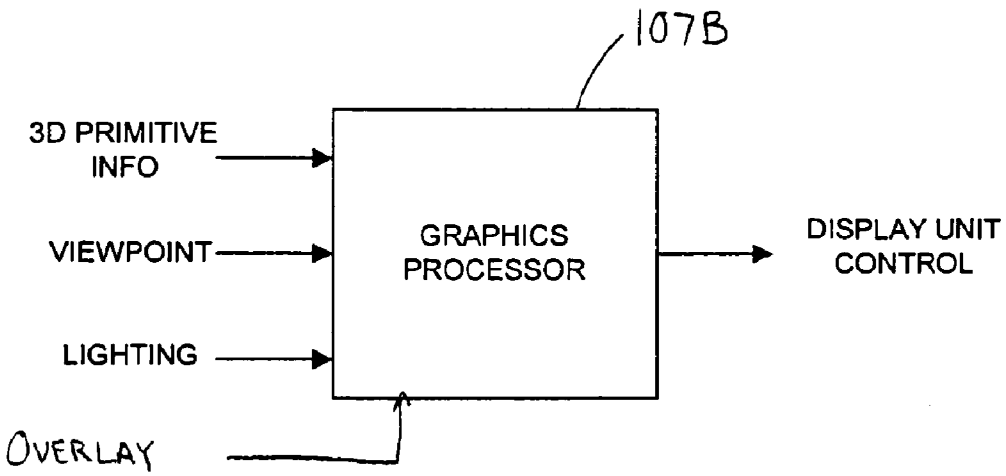

Referring now to FIGS. 3, 6A, and 6B, two examples of graphics processors that may be used in the gaming unit 20 are illustrated. FIG. 6A illustrates a graphics processor 107A configured to receive information relating to 2D primitives from, for example, microprocessor 104. The graphics processor 107A may generate one or more control signals for driving display unit 70. With the graphics processor 107A, the transform and lighting step may be implemented, for example, with the microprocessor 104. Optionally, graphics processors 107A and 107B may be configured to receive an overlay input. The overlay input may be used to provide an image that is to overlay a base image. Additionally, graphics processors 107A and 107B may be configured to optionally overlay the image such that it appears transparent.

FIG. 6B illustrates a graphics processor 107B configured to receive information that may include information relating to 3D primitives, point of view, and lighting (if any). This information may be received, for example, from microprocessor 104. In this example, the graphics processor 107B may implement the "Transform and Lighting" processing step described above. It is to be understood that 3D graphics processing implementation can be partitioned between the graphics processor 107 and the microprocessor 104 in any number of ways. For example, much of the processing typically implemented by commercially available graphics processors could be implemented by the microprocessor 104, thus eliminating or reducing the cost of graphics processor 107.

Details of 3D graphical techniques that may be used are described in "OpenGL Reference Manual: The Official Reference Document to Open GL, Version 1.2," 3rd edition, Dave Shreiner (editor), OpenGL Architecture Review Board, Addison-Wesley Publishing, Co., 1999, ISBN: 0201657651 and "OpenGL Programming Guide: The Official Guide to Learning OpenGL, Version 1.2," 3rd edition, Mason Woo et al. (editors), OpenGL Architecture Review Board, Addison-Wesley Publishing Co., 1999, ISBN: 0201604582, which are hereby incorporated by reference in their entirety for all purposes.

Additional detail pertinent to 3D graphics is available in commonly assigned U.S. patent application Ser. No. 09/927,901 (Client Reference No. P-557), entitled "Virtual Cameras and 3-D Gaming Environments in a Gaming Machine," filed Aug. 9, 2001, which is hereby incorporated by reference in its entirety for all purposes.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer programs) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C+, C++ or the like or any low-level, assembly or machine language. By storing the computer program portions therein, various portions of the memories 102, 106 are physically and/or structurally configured in accordance with computer program instructions.

Figure 7:
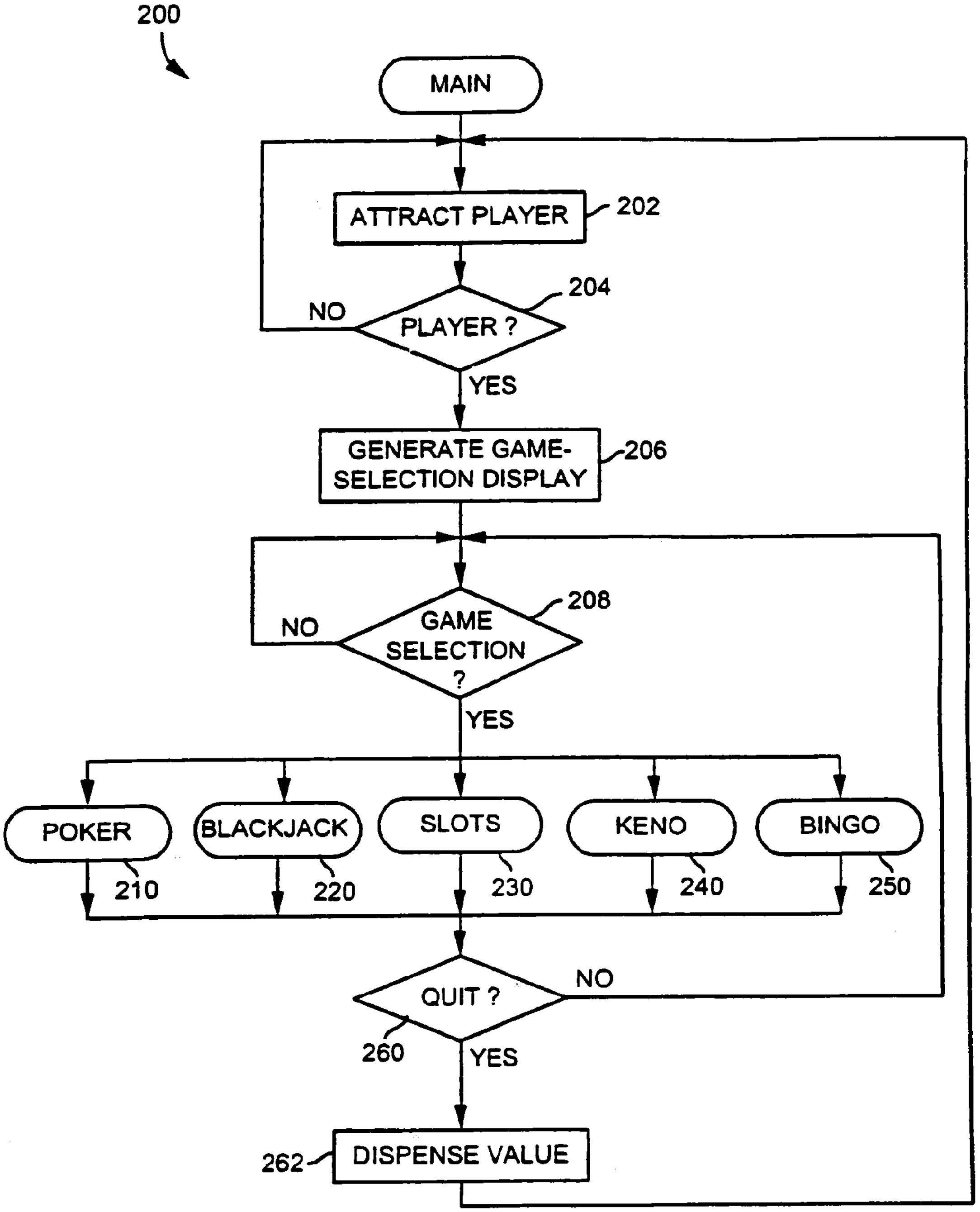
FIG. 7 is a flowchart of an embodiment of a main routine that may be performed during operation of one or more of the gaming units.

FIG. 7 is a flowchart of a main operating routine 200 that may be stored in the memory of the controller 100. Referring to FIG. 7, the main routine 200 may begin operation at block 202 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display maybe generated on the display unit 70 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 7, a different number of routines could be included to allow play of a different number of games. The gaming unit 20 may also be configured to allow play of different games.

Figure 8:
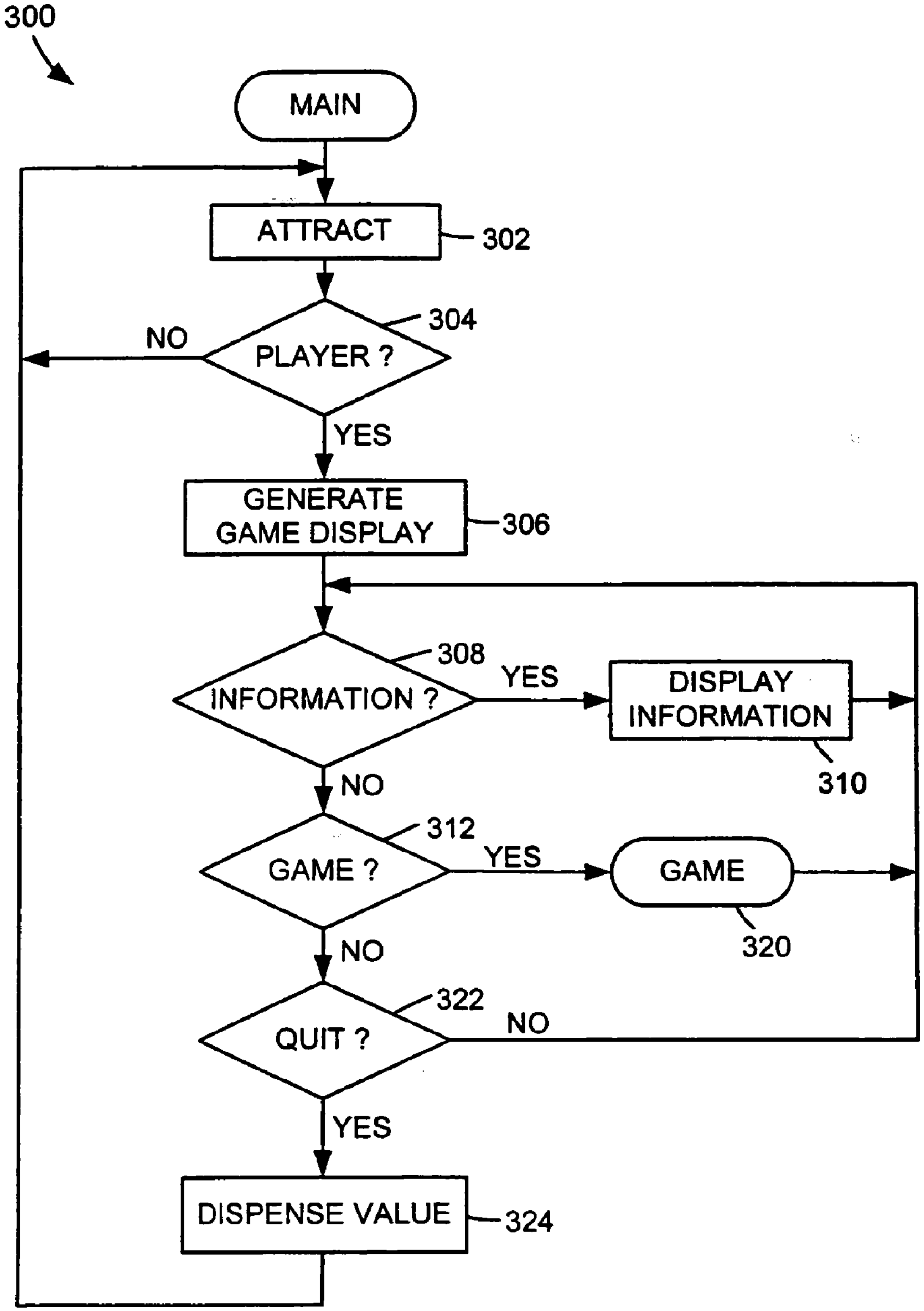
FIG. 8 is a flowchart of an alternative embodiment of a main routine that may be performed during operation of one or more of the gaming units.

FIG. 8 is a flowchart of an alternative main operating routine 300 that may be stored in the memory of the controller 100. The main routine 300 may be utilized for gaming units 20 that are designed to allow play of only a single game or single type of game. Referring to FIG. 8, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments; such as voice or music, to be generated via the speakers 62.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 maybe performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Video Poker

Figure 9:
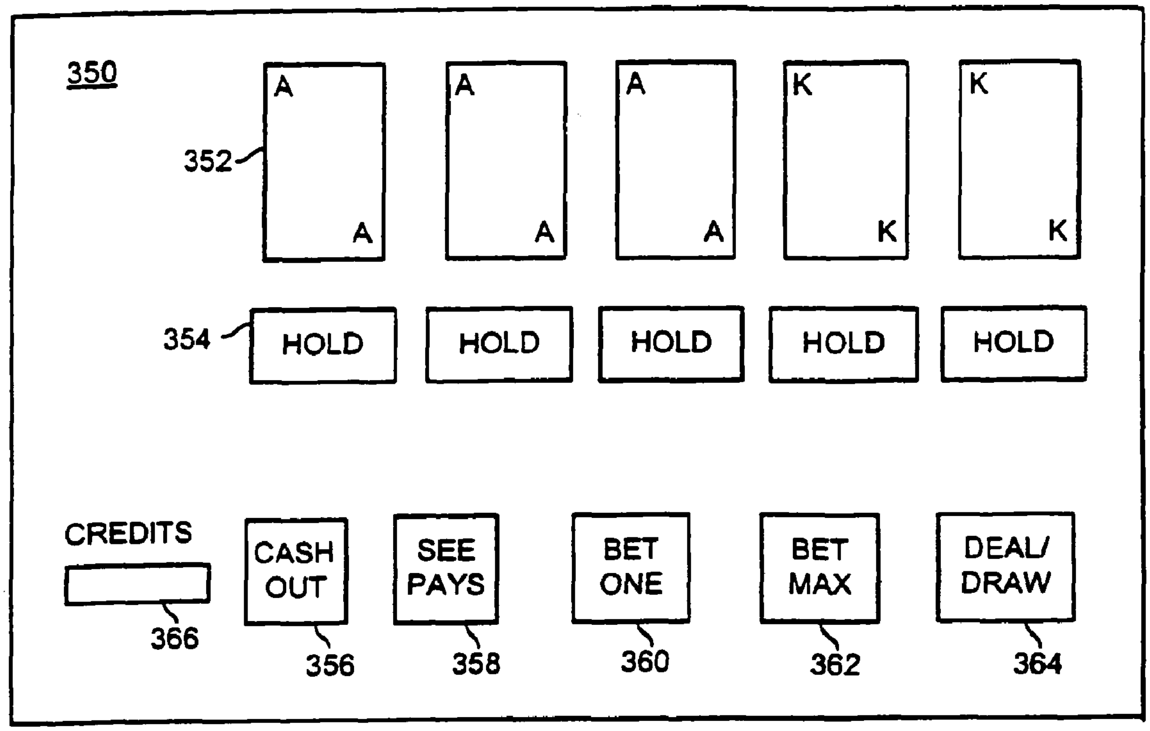
FIG. 9 is an illustration of an embodiment of a visual display that may be displayed during performance of the video poker routine of FIG. 11.

FIG. 9 is an exemplary display 350 that may be shown on the display unit 70 during performance of the video poker routine 210 shown schematically in FIG. 7. Referring to FIG. 9, the display 350 may include video images 352 of a plurality of playing cards representing the player's hand, such as five cards. To allow the player to control the play of the video poker game, a plurality of player-selectable buttons maybe displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons maybe provided as part of a control panel that is provided separately from the display unit 70.

Figure 11:
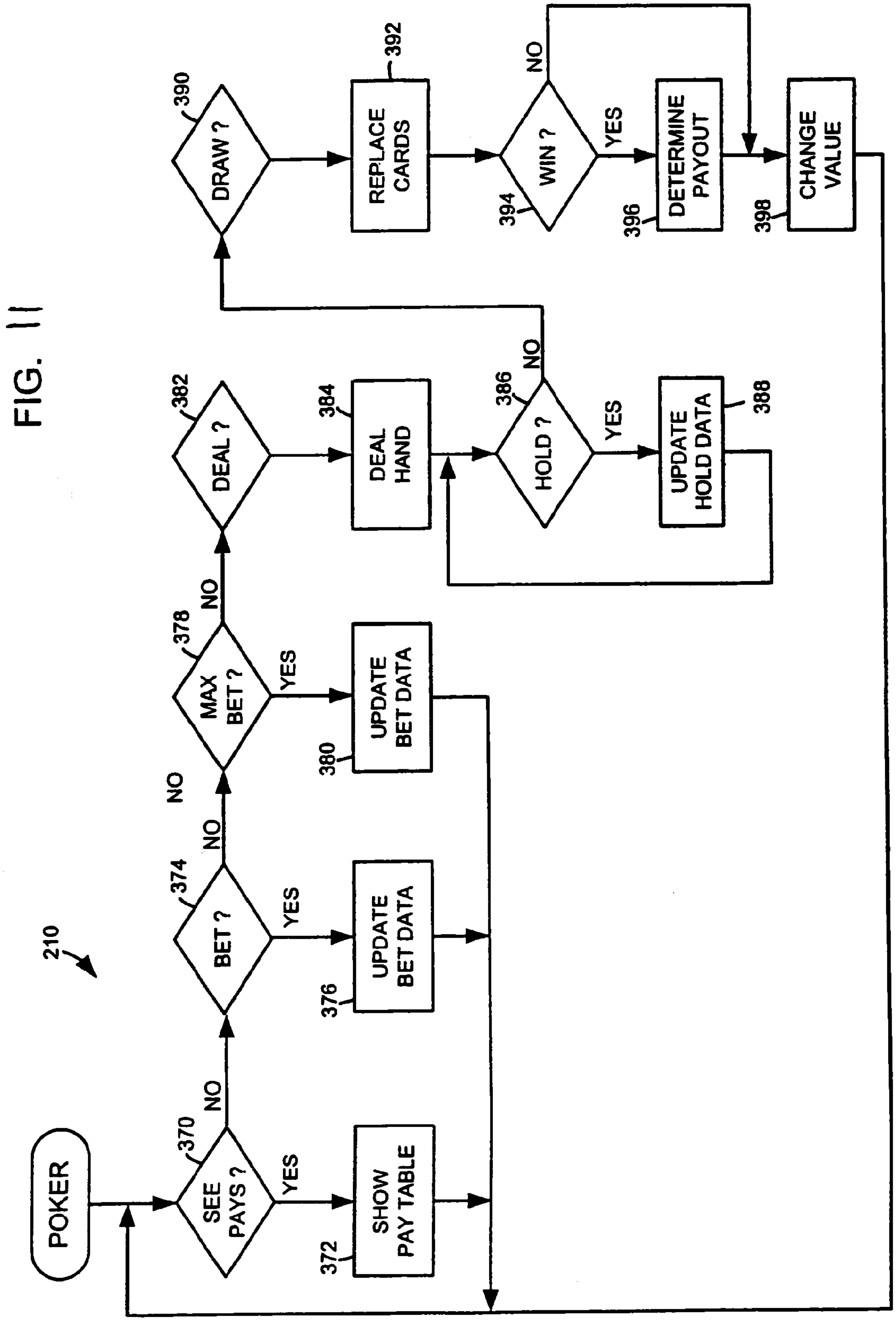
FIG. 11 is a flowchart of an embodiment of a video poker routine that may be performed by one or more of the gaming units.

FIG. 11 is a flowchart of the video poker routine 210 shown schematically in FIG. 7. Referring to FIG. 11, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 9).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 10:
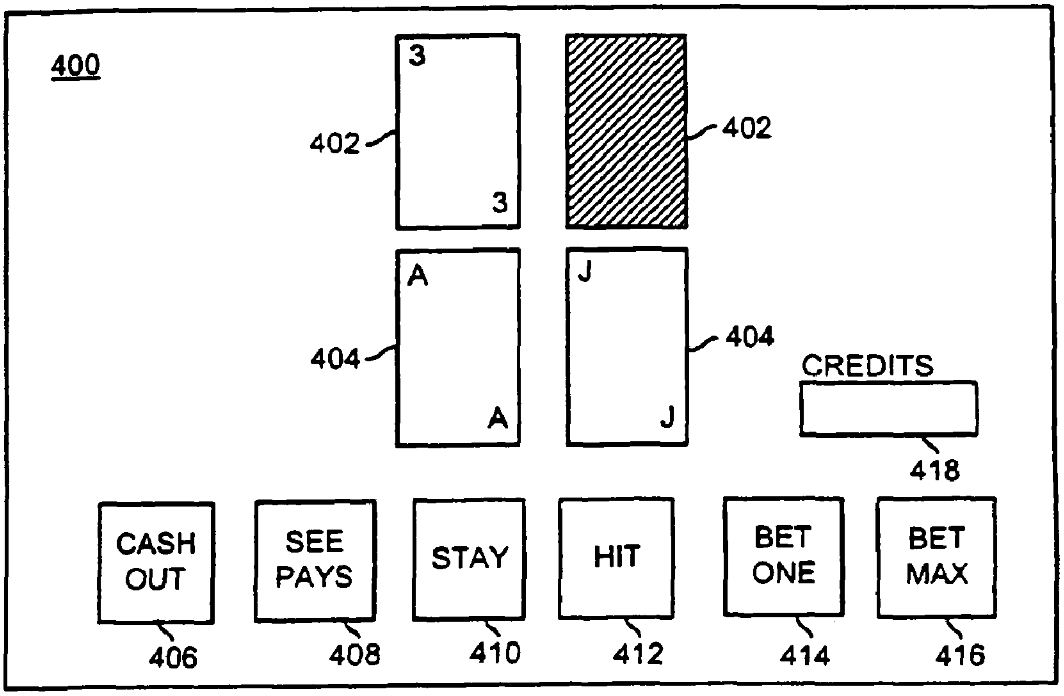
FIG. 10 is an illustration of an embodiment of a visual display that may be displayed during performance of the video blackjack routine of FIG. 12.

FIG. 10 is an exemplary display 400 that may be shown on the display unit 70 during performance of the video blackjack routine 220 shown schematically in FIG. 7. Referring to FIG. 10, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 41 8 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 12:
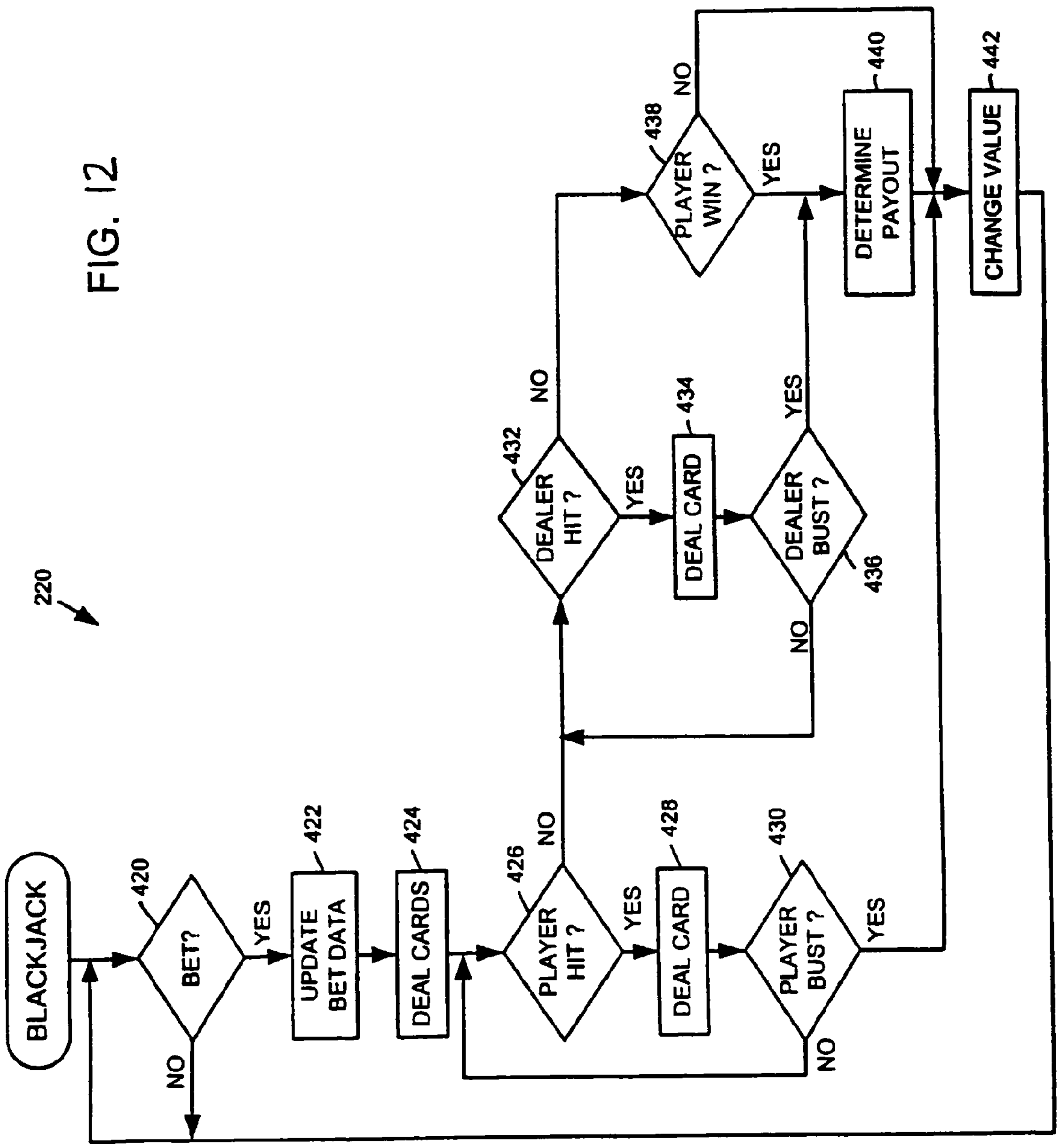
FIG. 12 is a flowchart of an embodiment of a video blackjack routine that may be performed by one or more of the gaming units.

FIG. 12 is a flowchart of the video blackjack routine 220 shown schematically in FIG. 7. Referring to FIG. 12, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 10).

Video Slots

FIG. 13 is an exemplary display 450 that may be shown on the display unit 70 during performance of the slots routine 230 shown schematically in FIG. 7. Referring to FIG. 13, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized. For example, U.S. Pat. No. 6,413,162 to Baerlocher et al. describes a gaming device having unisymbol display reels. Each symbol on a display of the gaming device represents, or is included on, a different reel. In one specific example, U.S. Pat. No. 6,413,162 describes displaying eighteen independent unisymbol reels, each capable of randomly generating and displaying one of a plurality of symbols. In another example, U.S. Pat. No. 6,413,162 describes unisymbol reels displayed in concentric circles.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 15:
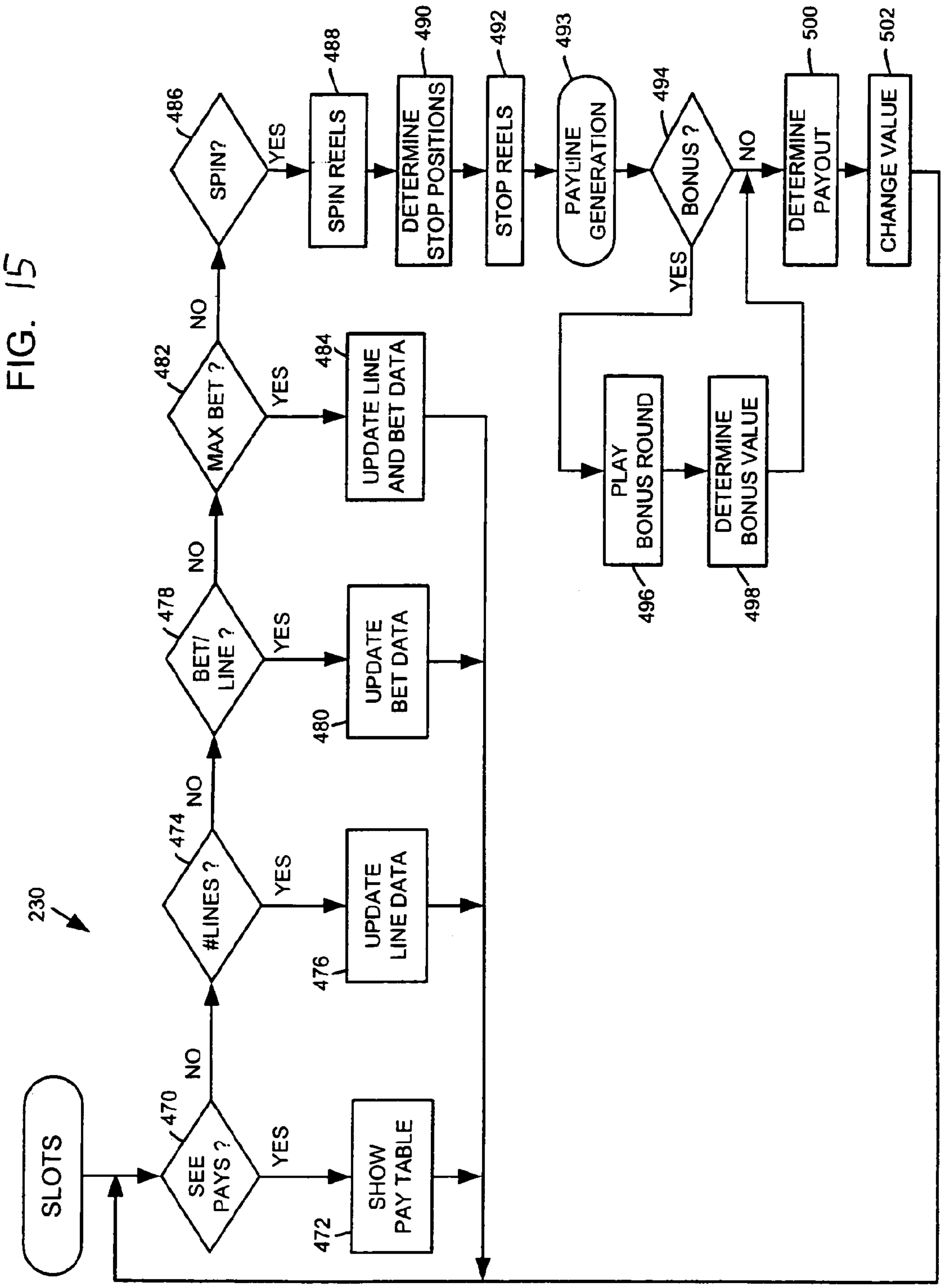
FIG. 15 is a flowchart of an embodiment of a slots routine that may be performed by one or more of the gaming units.

FIG. 15 is a flowchart of the slots routine 230 shown schematically in FIG. 13. Referring to FIG. 15, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet maybe stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence. After the routine stops the reel images 452 are block 492, paylines associated with winning symbols combinations may be generated and displayed to the user at block 493.

The payline generation routine 493, which is described in further detail in conjunction with FIGS. 19A-24, is responsible for generating 3-D representations of the paylines that overlay game displays. Additionally, the payline generation routine 493 converts the 3-D representations into 2-D graphics that may be presented to a user on the display 70 (FIG. 3). Although, by way of example, the payline generation routine 493 is shown as being called between blocks 492 and 494, it will be readily appreciated that the payline generation routine 493 could be called at any other point in the routine 230. Additionally, the payline generation routine 493 could be called more than just once at different locations in the routine 230. For example, the payline generation routine 493 could be called at any location at which it is desirable to display paylines to the user.

The routine 230 may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun maybe utilized instead.

Video Keno

FIG. 14 is an exemplary display 520 that may be shown on the display unit 70 during performance of the video keno routine 240 shown schematically in FIG. 7. Referring to FIG. 14, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a “Cash Out” button 526, a “See Pays” button 528, a “Bet One Credit” button 530, a “Bet Max Credits” button 532, a “Select Ticket” button 534, a “Select Number” button 536, and a “Play” button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 16:
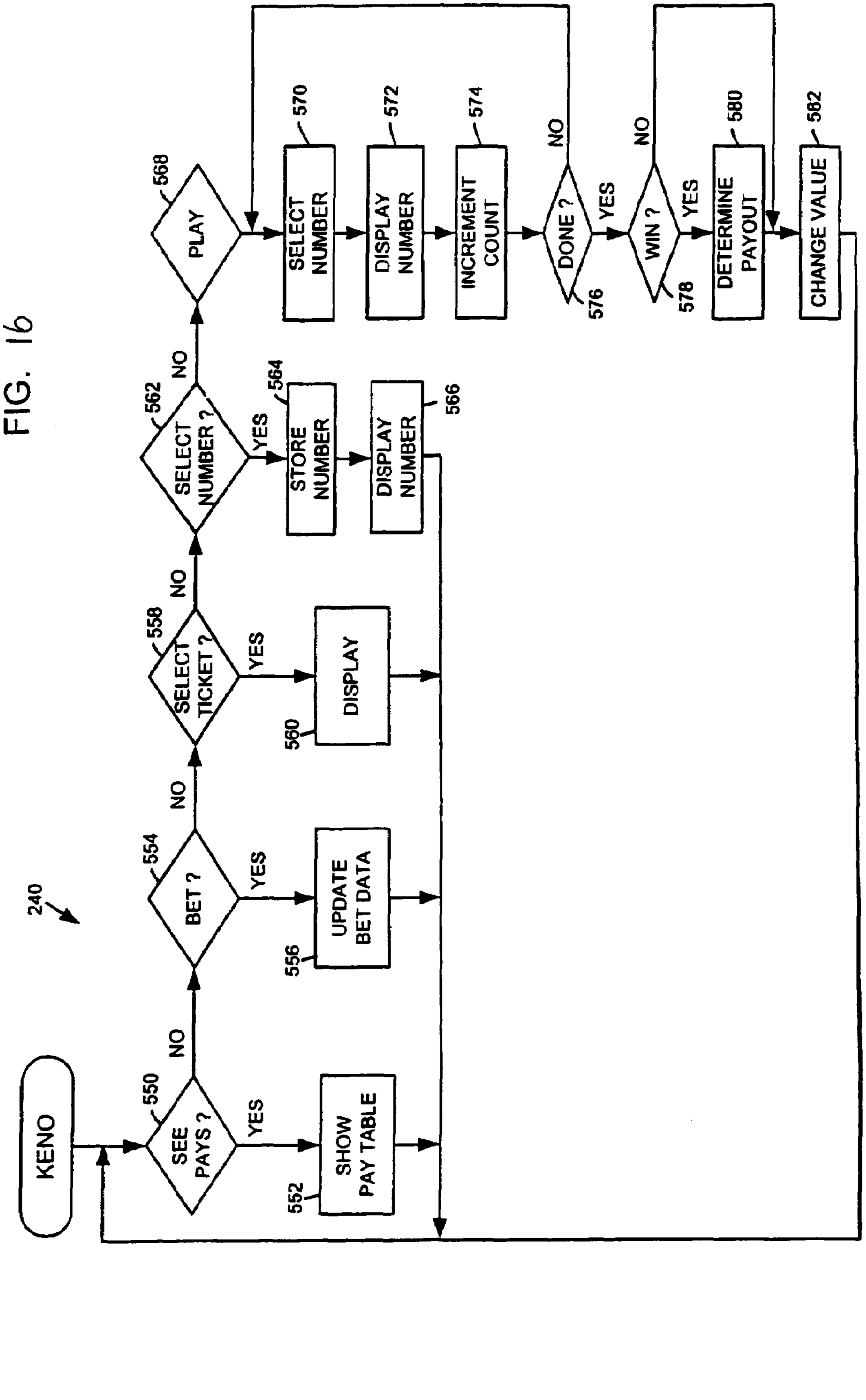
FIG. 16 is a flowchart of an embodiment of a video keno routine that may be performed by one or more of the gaming units.

FIG. 16 is a flowchart of the video keno routine 240 shown schematically in FIG. 7. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 16, at block 550, the routine may determine whether the player has requested payout information, such as by activating the “See Pays” button 528, in which case at block 552 the routine may cause one or more pay tables to be displayed on the display unit 70. At block 554, the routine may determine whether the player has made a bet, such as by having pressed the “Bet One Credit” button 530 or the “Bet Max Credits” button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player’s game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570. At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player’s cumulative value or number of credits may be updated by subtracting the bet made by the player and adding, if the keno game was won, the payout value determined at block 580. The cumulative value or number of credits may also be displayed in the display area 540 (FIG. 14).

Video Bingo

Figure 17:
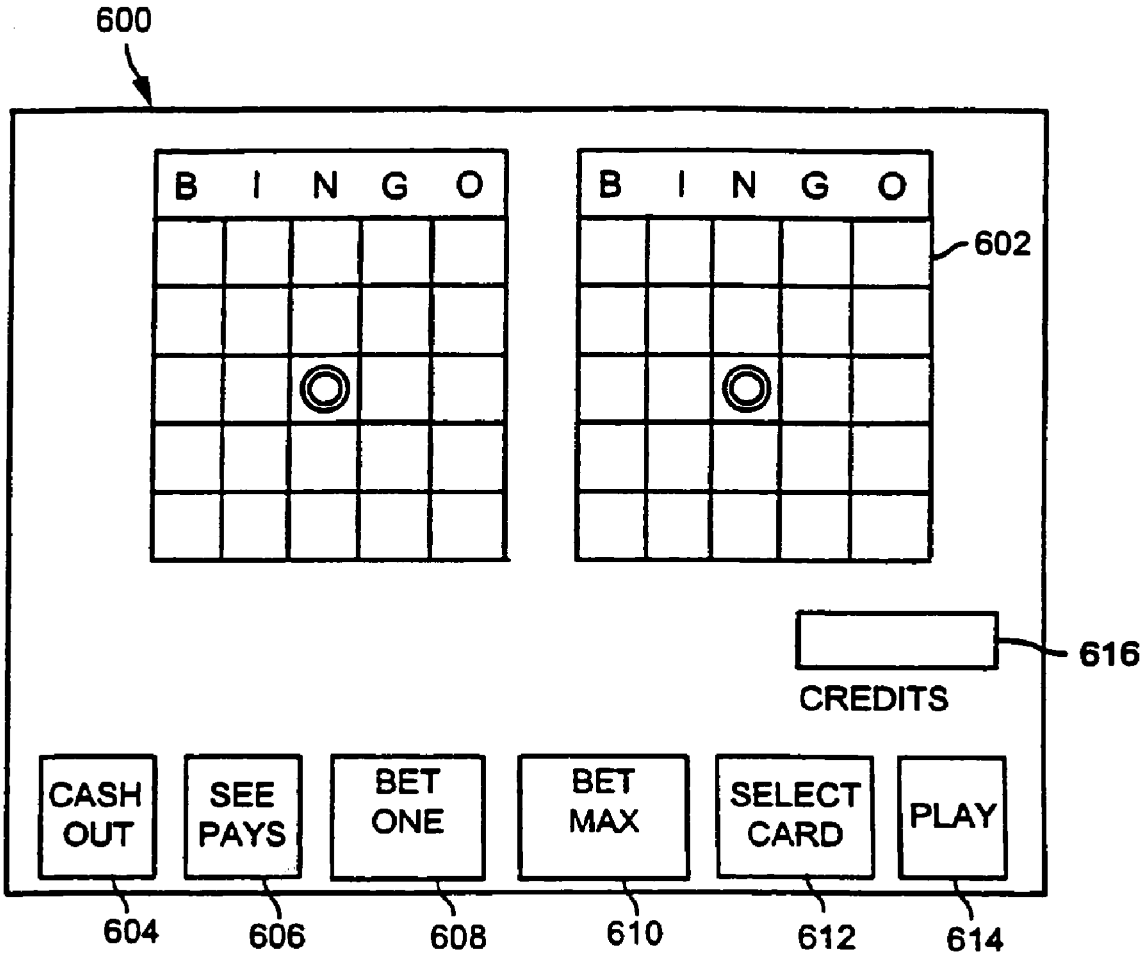
FIG. 17 is an illustration of an embodiment of a visual display that may be displayed during performance of the video bingo routine of FIG. 18.

FIG. 17 is an exemplary display 600 that may be shown on the display unit 70 during performance of the video bingo routine 250 shown schematically in FIG. 7. Referring to FIG. 17, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a “Cash Out” button 604, a “See Pays” button 606, a “Bet One Credit” button 608, a “Bet Max Credits” button 610, a “Select Card” button 612, and a “Play” button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 18:
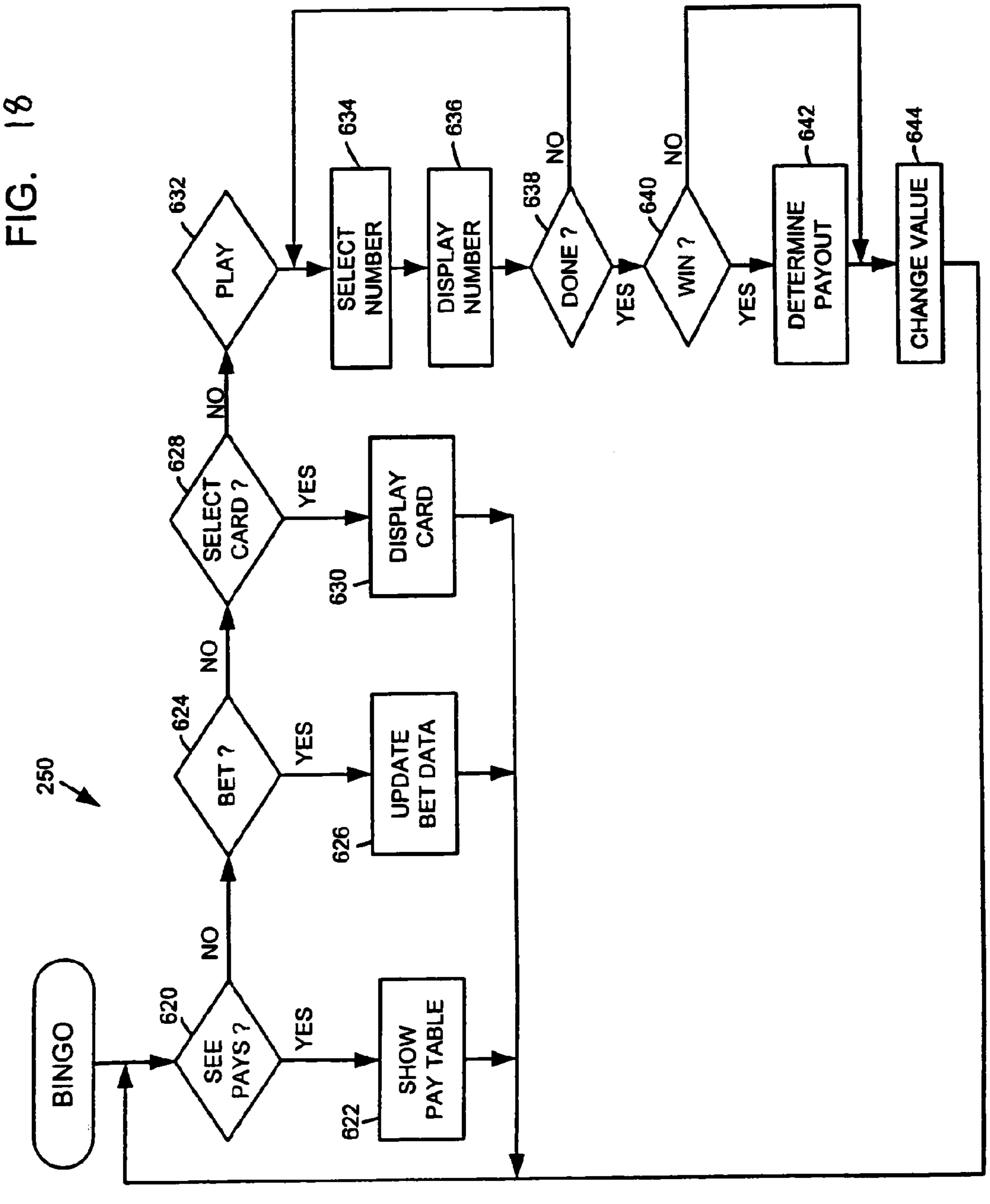
FIG. 18 is a flowchart of an embodiment of a video bingo routine that may be performed by one or more of the gaming units.

FIG. 18 is a flowchart of the video bingo routine 250 shown schematically in FIG. 7. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected. Referring to FIG. 18, at block 620, the routine may determine whether the player has requested payout information, such as by activating the “See Pays” button 606, in which case at block 622 the routine may cause one or more pay tables to be displayed on the display unit 70. At block 624, the routine may determine whether the player has made a bet, such as by having pressed the “Bet One Credit” button 608 or the “Bet Max Credits” button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game.

If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 17).

Payline Generation

Examples of techniques for generating paylines will now be described. For ease of explanation, these examples are described in the context of a reel-type slot machine game. It will be appreciated by one of ordinary skill in the art, however, that paylines can be used in other games as well. For example, techniques similar to those described below can be used to generate paylines in games, such as checkers and Othello, to indicate how a player won the game.

Figure 19A:
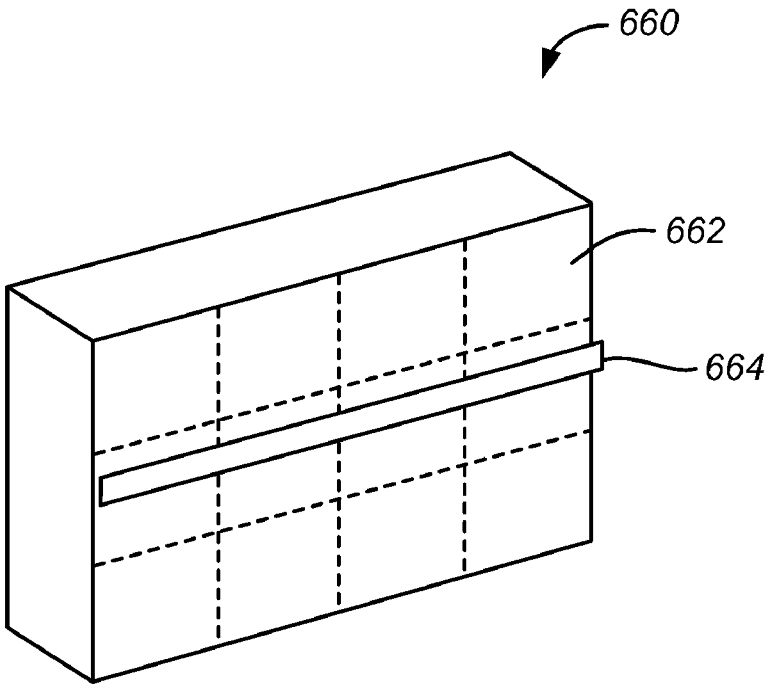
FIGS. 19A and 19B are illustrations of a virtual slot machine and a payline in a 3-dimensional model space.
Figure 19B:
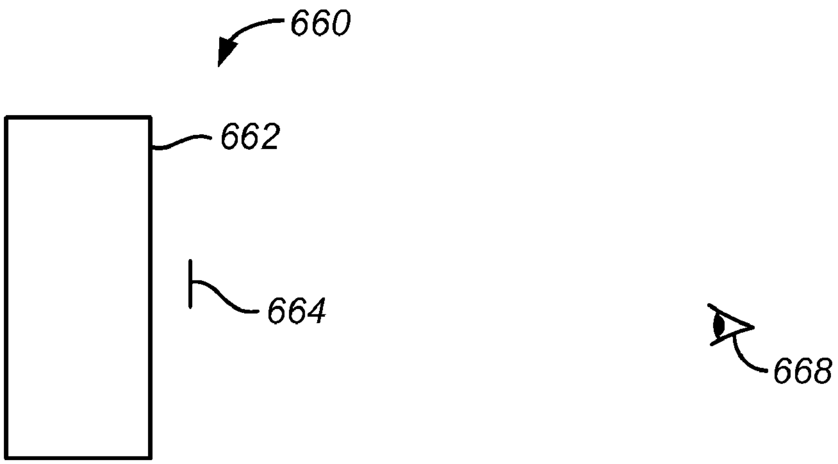

FIGS. 19A and 19B illustrate an example of a virtual slot machine and a payline in 3D model space. In particular, the virtual slot machine model includes an object 660 with a flat face 662. An image (or images) of slot reels may be mapped onto face 662. For instance, in the example of FIG. 19A, an image (or images) .of four slot reels is (are) mapped onto face 662, where three symbols on each reel are visible. During a game, the image (or images) of slot reels on face 662 may mimic the rotation of reels on a mechanical slot machine. Additionally, FIG. 19A illustrates a payline 664. FIG. 19B illustrates object 660 and payline 664 as viewed from the side of object 660. From viewpoint 668, payline 664 appears to be in front of object 660.

Figure 20:
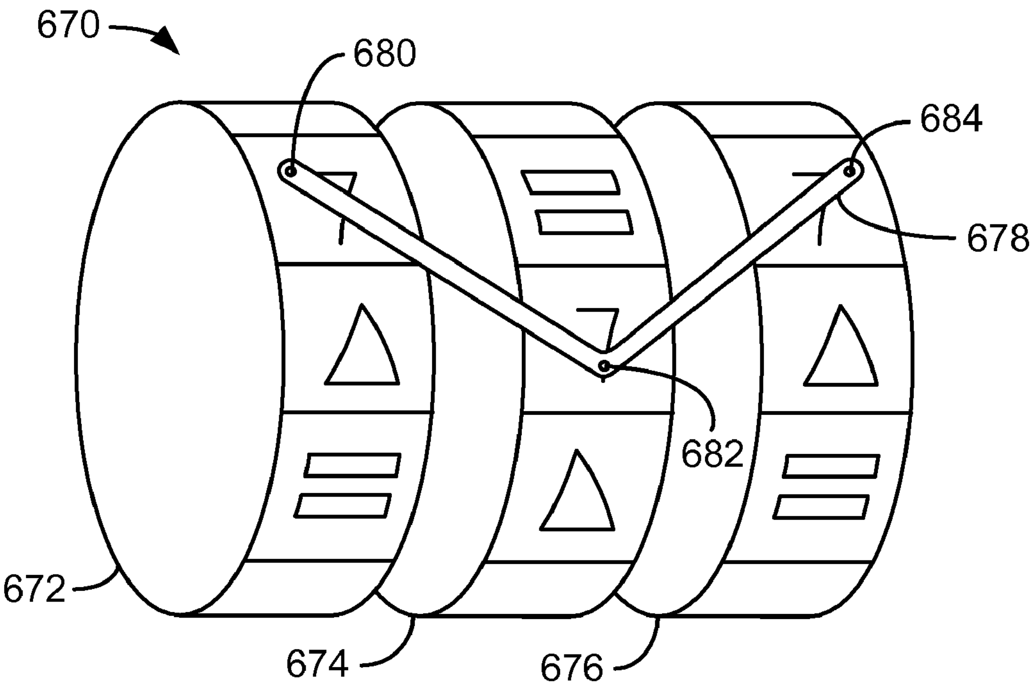
FIG. 20 is an illustration of a virtual slot machine and a payline in a 3-dimensional model space.

The image or images of slot reels need not be mapped onto the face 662 of an object 660. For example, the images of slot reels could be mapped onto a plane. Additionally, although the example of FIGS. 19A and 19B illustrate the virtual slot machine modeled as an image or images mapped onto a flat face, the virtual slot machine can be modeled in other ways as well. FIG. 20 illustrates another example of a virtual slot machine and a payline in 3D model space. The model 670 of virtual slot machine includes three reels modeled as three cylinders 672, 674, and 676. Each reel has mapped on it an image or images of symbols. The model 670 also includes a payline 678 that passes through reference points 680, 682, and 684.

Turning now to FIGS. 3, 6A, 6B, 19A, 19B, and 20, microprocessor 104 may generate a 3D model of a slot machine game. The 3D model may include virtual slot reels and one or more paylines. FIGS. 19A, 19B, and 20 illustrate examples of 3D models of slot machine including virtual slot reels and paylines.

Microprocessor 104 may generate 3D primitives corresponding to the virtual slot reels and the payline. In some embodiments, these 3D primitives are provided to a graphics processor 107, along with other information such as lighting information. In these embodiments, the graphics processor 107 may perform "Transform and Lighting" processing on the 3D primitives, and may generate a signal for causing display unit 70 to display an image of the virtual slot reels and the payline. In other embodiments, microprocessor 104 may perform "Transform and Lighting" processing on the 3D primitives to generate 2D primitives. In these embodiments, these 2D primitives may be provided to graphics processor 107, which may generate a signal for causing display unit 70 to display an image of the virtual slot reels and the payline.

Figure 21:
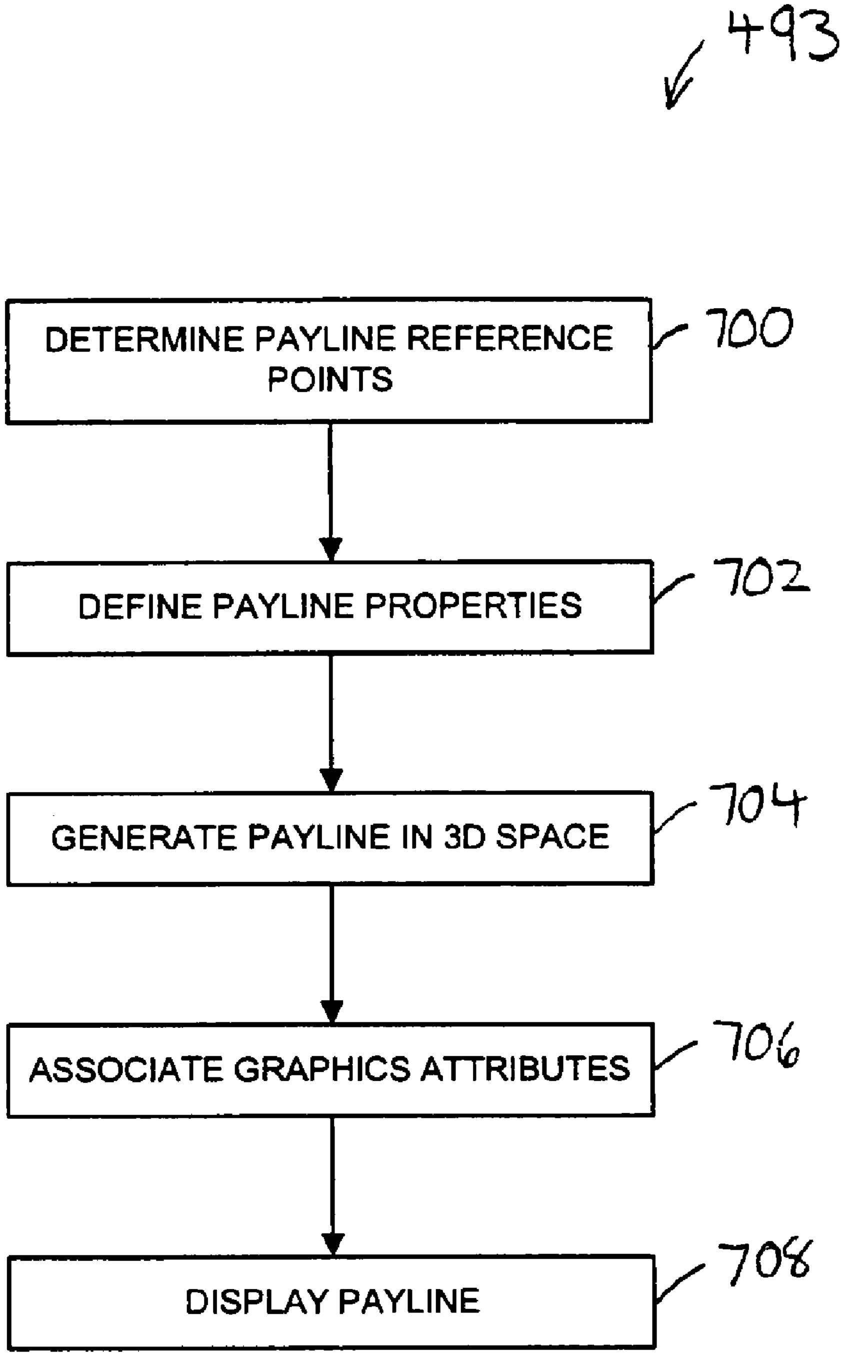
FIG. 21 is a flowchart of an embodiment of a payline generation routine.

As described above with reference to FIG. 15, a payline or paylines may be generated after the reels of the virtual slot machine stop spinning, and if the player has won. FIG. 21 is one embodiment of a method 493 for generating a payline. Method 493 will be described with reference to FIG. 24. In some embodiments, method 493 may be implemented by microprocessor 104 in conjunction with graphics processor 107.

At block 700, locations of reference points in 3D model space of the payline may be determined. For example, in FIG. 24, the locations of reference points 680, 682 and 684 may be generated, retrieved from a look-up table, etc. In some embodiments, the reference points generated at block 700 may be between the virtual reels of the slot machine and the viewpoint.

At block 702, payline properties may be defined. The payline properties may include one or more (or none) of, but are not limited to, payline width, payline curve radius, the number of polygons to be used to define curves, etc. Alternatively, or additionally, other payline properties may include payline thickness, distance from the reel face, etc. The payline properties may be defined ahead of time and stored in, for example, memory 102 or memory 106 (FIG. 3). Then, during operation, the payline properties can be retrieved from memory.

At block 704, a payline may be generated in 3D model space. One embodiment of a method for generating the payline in 3D model space will be described subsequently with reference to FIG. 22. At block 706, graphics attributes may be associated with the payline. Such attributes may include, for example, color, texture, texture mapping, transparency, translucency, etc. One or more, or none, of these attributes (or other attributes) can be associated with the payline. Using various graphics attributes, the payline can be made to appear to oscillate, move, rotate, pivot, slide on the screen, flash, fade in, fade out, shrink, grow, etc. Similarly, the scale of the payline in various dimensions may be changed. Additionally, the payline may appear to be on fire, be drawn by a laser, or the payline's colors may appear to change. Also, a varying transparency effect can be employed to help make the payline edges appear smooth. Further, the payline may appear to morph into different shapes. For example, the payline may appear to morph to include boxes around winning symbols in a reel-type slot machine game.

At block 708, the payline may be displayed. If a graphics processor such as the graphics processor 107B of FIG. 6B is used, displaying the payline may include providing the 3D primitive information generated at block 704 to the graphics processor 107. This may also include providing the effects information associated with the payline (block 706) to the graphics processor 107. If a graphics processor such at the graphics processor 107A is used, displaying the payline may include the microprocessor performing "Transform and Lighting" processing on the 3D primitive information generated at block 704 to generate 2D primitive information. Then, the 2D primitive information may be provided to graphics processor 107. Next, graphics processor 107 generates one or more control signals that control display unit 70 to display an image of the slot reels and the payline.

Figure 22:
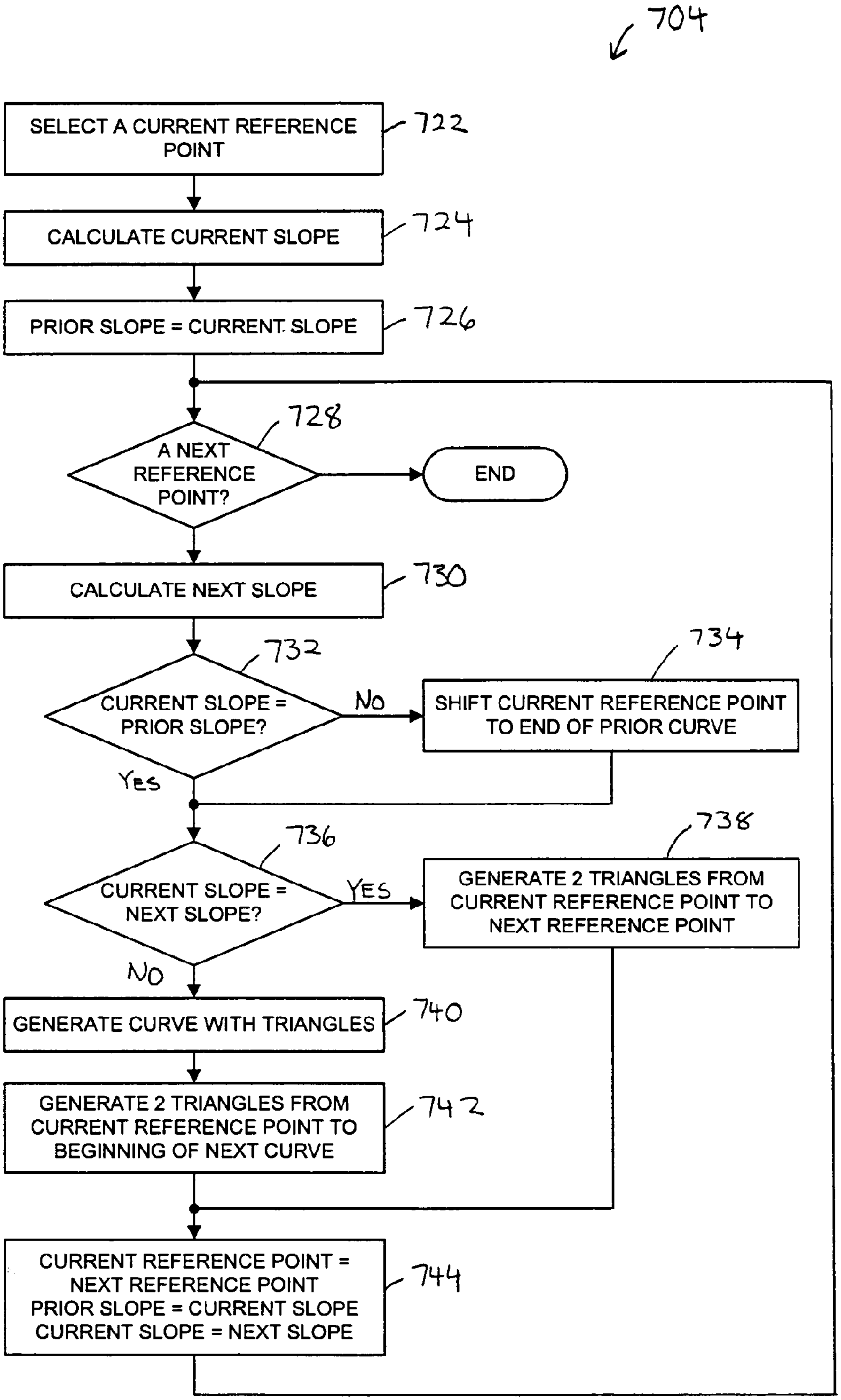
FIG. 22 is a flowchart of an embodiment of a routine for generating a payline in 3-dimensional model space.

FIG. 22 is a flow diagram illustrating one embodiment of a method 704 for generating a payline in 3D model space. Method 704 will be described with reference to FIG. 24. At block 720, one of the reference points generated at block 700

(FIG. 21) may be selected as a current reference point. For example, in FIG. 24, reference point 752 may be selected as the current reference point.

Figure 24:
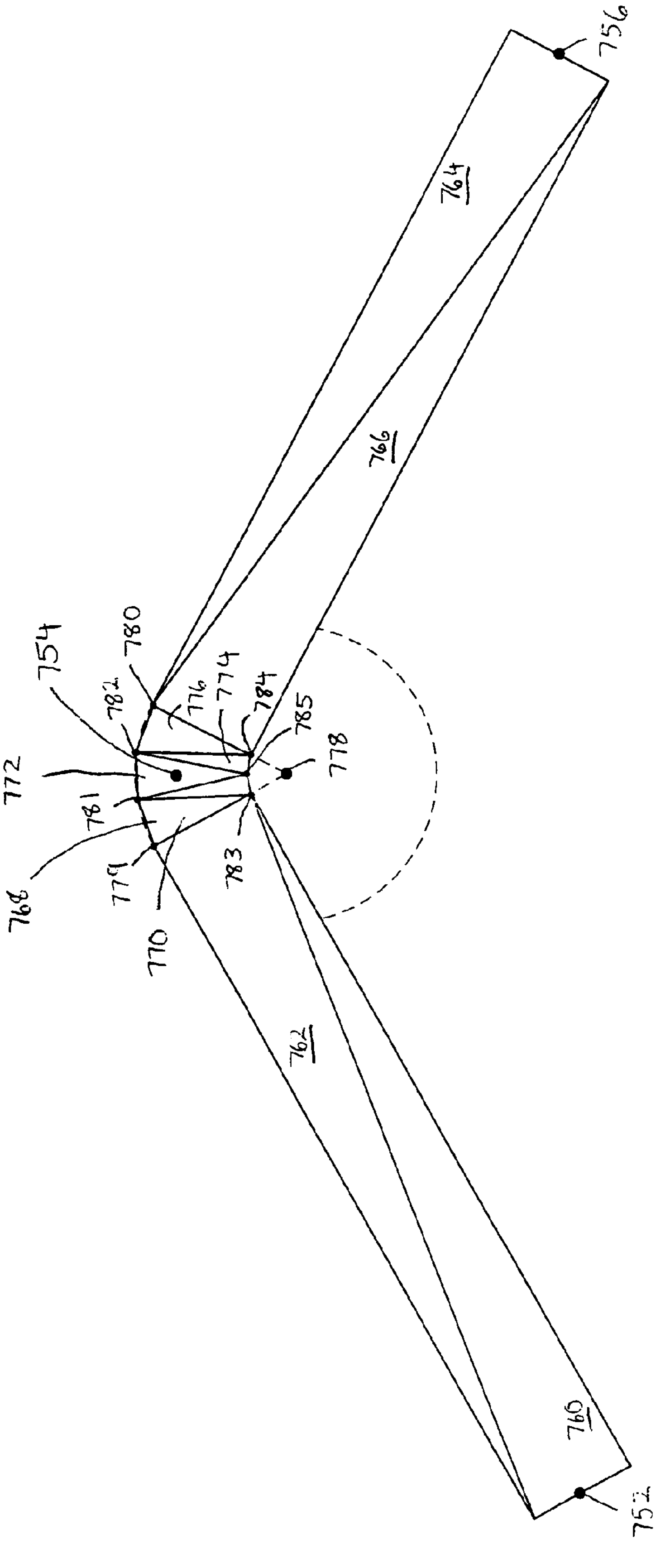
FIG. 24 is an illustration of a payline comprised of primitives in a 3-dimensional model space.

At block 724, a current slope may be generated. In FIG. 24, for example, the 30 current slope may be the slope between reference points 752 and 754. At block 726, a prior slope may be set to the current slope.

At block 728, it may be determined whether there is a next reference point. For example, in FIG. 24, if reference point 752 is the current reference point, reference point 754 may be considered a next reference point. If there is no next reference point, the routine may end. If there is a next reference point, control may pass to block 730.

At block 730, a next slope may be calculated. In FIG. 24, for example, the next slope may be the slope between reference points 754 and 756.

At block 732, it may be determined whether the current slope is the same as the prior slope. If yes, control may pass to block 736. If no, control may pass to block 734. If the current slope is different than the prior slope, this may indicate that a curve was previously generated. In FIG. 24, for example, if the current reference point was 754, the current slope would be different than the prior slope, indicating a curve had been generated. Thus, at block 734, the current reference point may be shifted in position to the end of the curve in the direction of the next reference point. In FIG. 24, for example, if reference point 754 was the current reference point, the position of reference point 754 would be shifted to location 755. Then, control may pass to block 736.

At block 736, it may be determined whether the current slope is the same as the next slope. If yes, control may pass to block 738. At block 738, two triangles may be generated from the current reference point to the next reference point to form a segment of the payline between the two reference points. In particular, the two triangles may form a segment having the payline width (which may be defined at block 702, FIG. 21). Control may then pass to block 744.

If at block 736, it was determined that the current slope is not the same as the 25 next slope, control may pass to block 740.

At block 740, a curve in the payline may be formed. For instance, the curve maybe formed using a plurality of triangles. In FIG. 24, for example, a curve about reference point 754 is generated with five triangles 768, 770, 772, 774, 776. Parameters for generating the curve may be defined previous to executing block 740. Such parameters may include, for example, a curve radius, a number of polygons to be included in the curve. Such parameters may be defined, for example, at block 702, of FIG. 21. Any number of techniques for generating curves can be used, including those known to those of ordinary skill in the art of graphics processing. One example of a method for generating a curve will be described subsequently with reference to FIG. 23. Then, control may pass to block 742.

At block 742, two triangles may be generated from the current reference point to the beginning of the curve generated at block 740, to form a segment of the payline between the two reference points. In particular, the two triangles may form a segment having the payline width (which may be defined at block 702, FIG. 21). In FIG. 24, for example, the two triangles 760 and 762 form a payline segment from reference point 752 to the beginning of the curve about reference point 754. Control may then pass to block 744.

At block 744, the current reference point may be set to the next reference point. In FIG. 24, for example, if reference point 752 was the current reference point, the current reference point may be set to reference point 754. Additionally at block 744, the prior slope may be set to the current slope. Similarly, the current slope may be set to the next slope. Then, control may pass to block 728.

Although in the embodiment described above, the generated payline is a flat object in 3D model space, other types of paylines may be used. For example, the payline may have a thickness. Similarly, the payline may be cylindrical, have a triangular cross section, a hexagonal cross section, etc. Also, if slopes between different segments in the payline are different, a curve need not be generated (as in block 740). Rather, the payline may include "sharp" vertices.

Additionally, although in the embodiment described above, the generated payline is located in one plane in 3D model space, the payline could have a different structure. For example, one segment of the payline may lie in a first plane, and a second segment may lie in a second plane different than the first plane. In these embodiments, a location in the payline in which is to be generated may be determined, for example, by examining the direction of lines between reference points, gradients between reference points, etc. Also, the payline, or a portion thereof, may be curved in 3D model space, with a segment not lying in one plane. As a specific example, the payline, or a portion thereof, may have a helical structure.

Also, the payline need not reside "in front" of the game display. Referring to FIG. 20, for example, the payline generated could extend from the front of reel 672, to the rear of reel 674, and then to the front of reel 676.

Curve Generation

Figure 23:
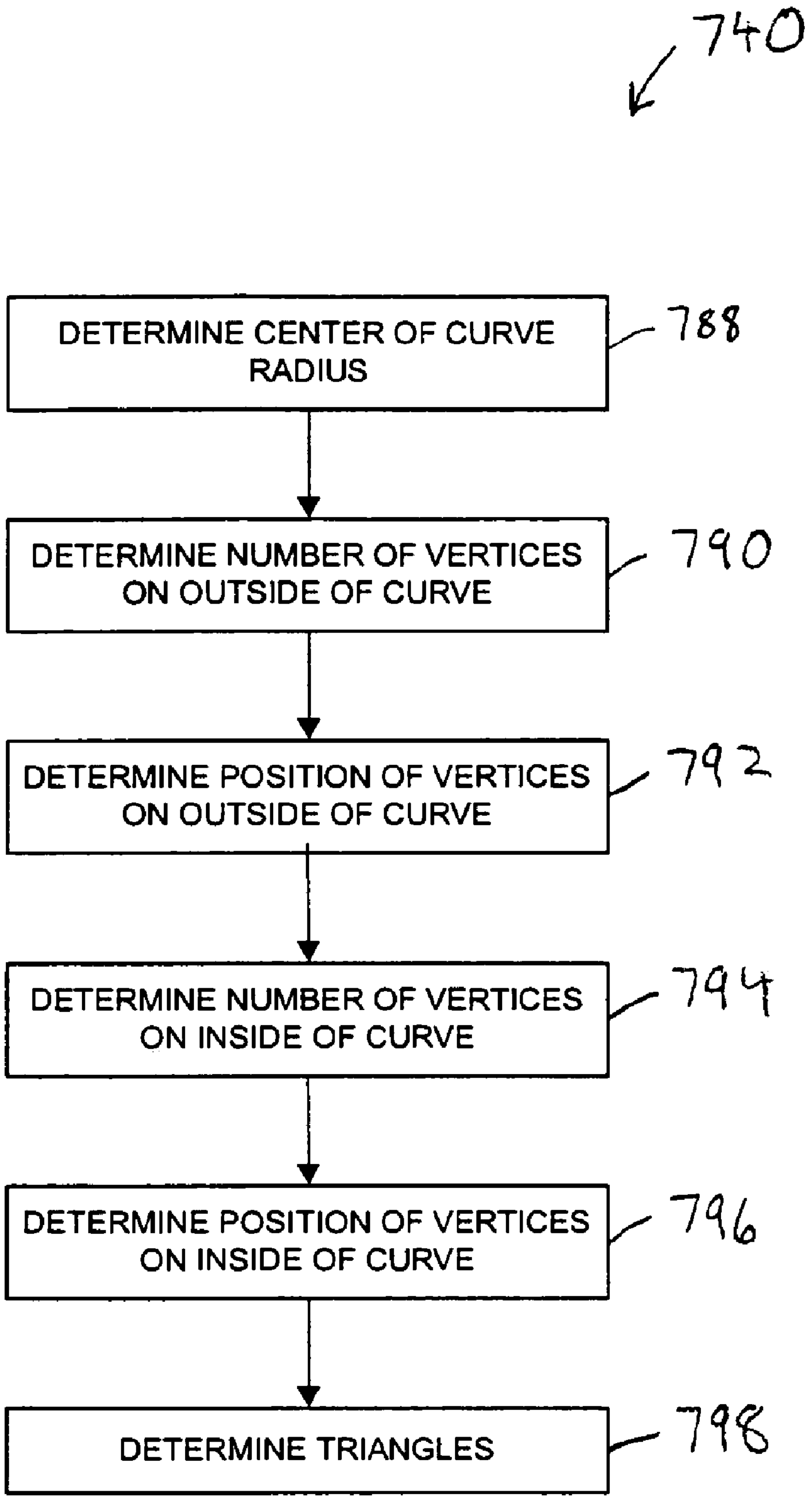
FIG. 23 is a flowchart of an embodiment of a routine for generating a curve comprising a plurality of triangles.

FIG. 23 is a flow diagram illustrating one embodiment of a method 740 for generating a curve in a payline. Method 740 will be described with reference to FIG. 24. At block 788, a center of the curve radius is determined. The curve radius R may be previously defined, for example, at block 702 of FIG. 21. Additionally, the width W of the payline may be previously defined, for example, at block 702 of FIG. 21. In one embodiment, the center may be determined by calculating perpendicular distances from lines between the reference points of the payline. In FIG. 24 for example, the center point 778 may be the point that is a perpendicular distance R-W/2 from the line between reference points 752 and 754, and that also is the perpendicular distance R-W/2 from the line between reference points 754 and 756.

At block 790, a number of vertices on the "outside" of the curve may be determined. In one embodiment, the number of vertices can be determined based on a number of triangles that are to be included in the curve. The number K of triangles may be previously defined, for example, at block 702 of FIG. 21. For example, the number of vertices on the outside of the curve may be determined as K/2 rounded up to the nearest integer, plus 1. In FIG. 24, for example, the number K of triangles is five. Thus, the number of vertices on the outside of the curve is four (5/2 rounded up to 3 plus 1).

In other embodiments, the number of vertices may be previously defined, for example, at block 702 of FIG. 21. Additionally, the number of vertices may be determined by retrieving the number from a look up table based on the number K of triangles.

At block 792, positions of the vertices on the outside of the curve may be determined. In one embodiment, a position of one vertex is determined as being a distance R from the center point on a line that is perpendicular to a line between the reference point about which the curve is being generated and the previous reference point. For example, in FIG. 24, vertex 779 is at a distance R from center point 778 on a line that is perpendicular to the line between reference points 752 and 754.

In this embodiment, a position of another vertex is similarly determined as being a distance R from the center point on a line that is perpendicular to a line between the reference point about which the curve is being generated and the next reference point. For example, in FIG. 24, vertex 780 is at a distance R from center point 778 on a line that is perpendicular to the line between reference points 754 and 756.

In this embodiment, positions of the remaining vertices can be determined as being a distance R from the center point, and also being equidistant from other vertices. For example, in FIG. 24, vertices 781 and 782 are both a distance R from center point 778. Additionally, vertex 781 is equidistant between vertices 779 and 782. Similarly, vertex 782 is equidistant between vertices 780 and 781.

At block 794, a number of vertices on the "inside" of the curve may be determined. The number of vertices on the inside of the curve may be determined in a manner similar to that described with reference to block 790. For example, in one embodiment, the number of vertices can be determined based on a number of triangles that are to be included in the curve. The number K of triangles may be previously defined, for example, at block 702 of FIG. 21. For example, the number of vertices on the inside of the curve may be determined as K/2 rounded down to the nearest integer, plus 1. In FIG. 24, for example, the number K of triangles is five. Thus, the number of vertices on the inside of the curve is three (5/2 rounded down to 2 plus 1).

At block 796, positions of the vertices on the "inside" of the curve may be determined. The positions of the vertices on the inside of the curve may be determined in a manner similar to that described with reference to block 792. For example, in one embodiment, a position of one vertex is determined as being a distance R-W from the center point on a line that is perpendicular to a line between the reference point about which the curve is being generated and the previous reference point. For example, in FIG. 24, vertex 783 is at a distance R-W from center point 778 on a line that is perpendicular to the line between reference points 752 and 754.

In this embodiment, a position of another vertex is similarly determined as being a distance R-W from the center point on a line that is perpendicular to a line between the reference point about which the curve is being generated and the next reference point. For example, in FIG. 24, vertex 784 is at a distance R-W from center point 778 on a line that is perpendicular to the line between reference points 754 and 756.

In this embodiment, positions of the remaining vertices can be determined as being a distance R-W from the center point, and also being equidistant from other vertices. For example, in FIG. 24, vertex 785 is a distance R-W from center point 778. Additionally, vertex 785 is equidistant between vertices 783 and 784.

At block 798, triangles of which the curve is to be comprised are determined based on the vertices determined at blocks 792 and 796. For example, in FIG. 24, the triangles 768, 770, 772, 774, and 776 are determined based on the vertices 779, 780, 781, 782, 783, 784, and 785.

In other embodiments, the payline may be generated, for example, by retrieving polygon information (e.g., coordinates of vertices, polygon types, etc.) from a memory or look-up-table. In these embodiments, reference points of the payline may not be needed. Also, the methods described with reference to FIGS. 22 and 23 may not be needed. For instance, if a game includes five possible paylines, the five paylines could be designated, for example, by the numbers 1-5. Then, if it was desired to generate payline 1, polygon information for generating that payline could be retrieved from a look-up table.

Transparent Objects

Figure 25A:
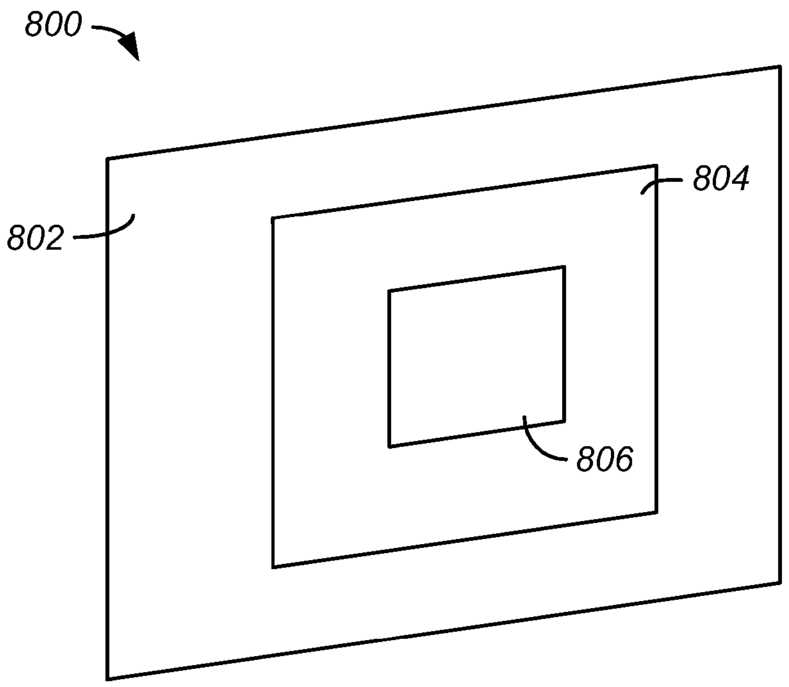
FIGS. 25A and 25B are illustrations of a game display and an object in a 3-dimensional model space.
Figure 25B:
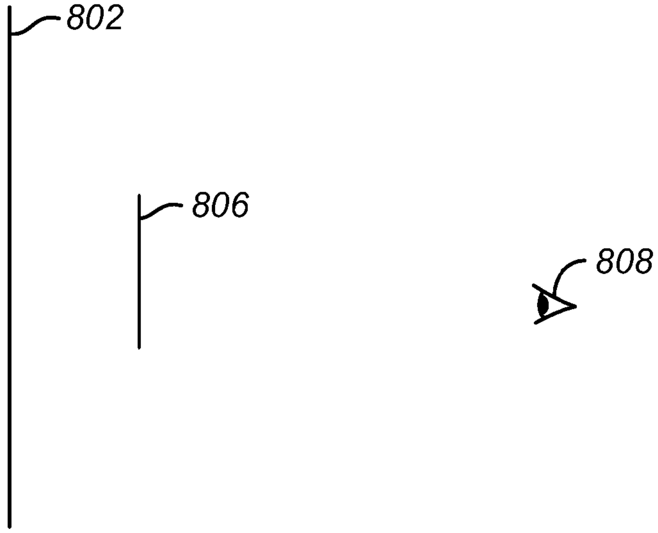

FIGS. 25A and 25B illustrate an example of a game display and a transparent object in 3D model space. In particular, the 3D model 800 includes a plane 802 having a game display 804 mapped thereon. As merely one example, game display 804 may include an image (or images) of slot reels. Additionally, the 3D model includes a transparent object 806. The transparent object 806 can be, for example, an icon, a button, a menu, a window (e.g., gaff window, help window, tilt window, other informational windows such as a "You Won!" window, a "Printing Ticket" window, etc.), a screen display (e.g., a gaff screen, a help screen, a tilt screen, other informational screens such as a "You Won!" screen, a "Printing Ticket" screen, etc.), etc. FIG. 25B is a side view of the 3D model 800 showing that the transparent object 806 is between the plane 802 having the game display 804, and a point of view 808.

During a game, the game display 804 may include the image (or images) of a game being played, such as reels of a slot machine, a hand of cards, etc. The transparent object 806 may be rendered during the play of a game. For example, if a "tilt" condition occurred, a "tilt window" 806 could be rendered. Because the object 806 is transparent, aspects of the game display 804 may be visible despite being "behind" the object 806.

It is to be understood that the game display 804 need not be a flat 2D object on a plane 802. Rather, the game display could be a 3D object. For example, the game display could be a 3D object such as the virtual slot machine game illustrated in FIG. 20.

Figure 26:
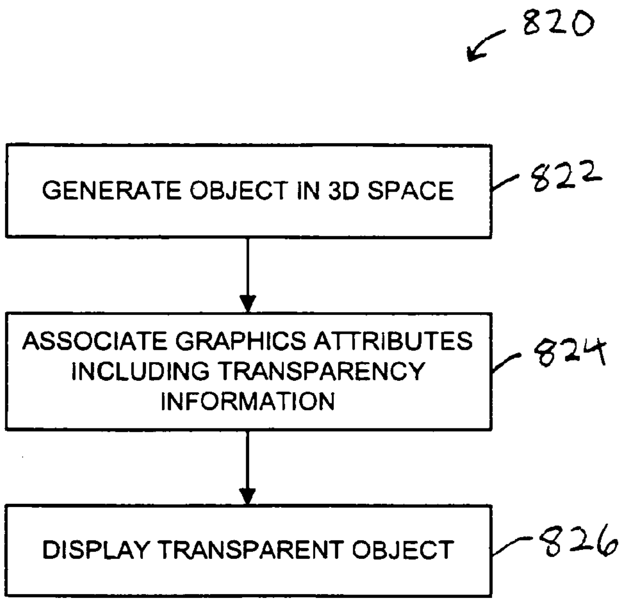
FIG. 26 is a flowchart of an embodiment of a routine for generating a transparent object on a game display.

FIG. 26 is a flow diagram illustrating one embodiment of a method 820 for displaying a transparent object, such as a window, icon, etc., on a game display. The method 820 will be described with reference to FIGS. 3, 6A, 6B, 25A, and 25B. At block 822, the object may be generated in 3D space. Generating the object in 3D space may include generating the 3D primitive information of one or more polygons that comprise the object. In FIG. 25A, for example, the object 806 may comprise one quadrilateral, two or more triangles, etc.

At block 824, graphics attributes are associated with the object, the graphics attributes including transparency information. The transparency information may include information such as one or more alpha values, one or more flags indicating the object is transparent, etc. Other attributes may include, for example, color, texture, texture mapping, etc. Additionally, using graphics attributes, the object can be made to appear to oscillate, move, rotate, pivot, or slide on the screen. Similarly, the object may appear to be on fire, be drawn by a laser, or the object's colors may appear to change.

At block 826, the transparent object may be displayed "over" the game display. If a graphics processor such as the graphics processor 107B of FIG. 6B is used, displaying the object may include providing the 3D primitive information generated at block 822 to the graphics processor 107. This may also include providing the effects information associated with the object (block 824) to the graphics processor 107. If a graphics processor such at the graphics processor 107A of FIG. 6A is used, displaying the object may include the microprocessor 104 performing "Transform and Lighting" processing on the 3D primitive information generated at block 822 to generate 2D primitive information. Then, the 2D primitive information may be provided to graphics processor 107. Next, the graphics processor 107 may generates one or more control signals that control display unit 70 to display an image of the object such that it appears to be transparent.

In some embodiments, the graphics processor 107 may combine the color information of the object with the color information of the image "behind" the object such that the object appears transparent. Any number of techniques may be used to combine the color information of the object with that of the underlying image, including techniques known to those of ordinary skill in the art. Such known techniques include "alpha blending," "screen-door" techniques, filtered transparency techniques, etc.

Figure 27:
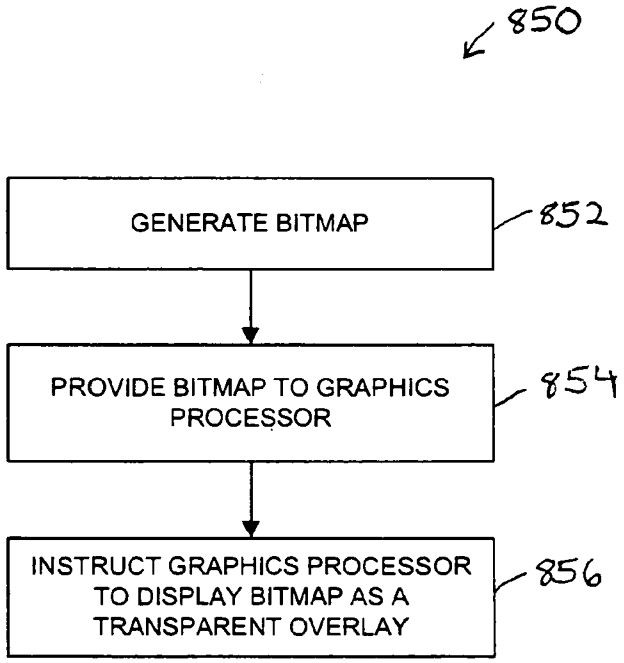
FIG. 27 is a flowchart of another embodiment of a routine for generating a transparent object on a game display.

As described with reference to FIGS. 6A and 6B, in some embodiments, graphics processor 107 may include an external overlay input with an ability to configure the external overlay as transparent. FIG. 27 is flow diagram of an embodiment of a method 850 for generating a transparent object with such graphics processors. At block 852, a bitmap of the object as it is to be displayed on the display unit (except for its transparency) is generated. The bitmap may be generated when needed, generated ahead of time and stored in a memory, etc.

At block 854, the bitmap may be provided to the graphics processor 107. The bitmap may be provided to graphics processor 107 via its external overlay input (if included), a shared input or input/output interface, etc. At block 856, the graphics processor is instructed to display the bitmap as a transparent overlay. This may include indicating the location at which the bitmap is to be displayed on a screen, a degree of transparency, etc.

The above examples describe a single transparent object. It will be apparent to those of ordinary skill in the art, however, that there may be multiple transparent objects as well (e.g., 2, 3, 4, etc.). In these embodiments, two or more of the transparent objects may overlap when viewed from the viewpoint. In these embodiments, the color information from the game display and multiple transparent objects may be combined.

In the above description, various methods have been described with reference to flow diagrams. It will be apparent to one of ordinary skill in the art that each of these methods may be implemented, in whole or in part, by software, hardware, and/or firmware. If implemented, in whole or in part, by software, the software may be stored on a tangible medium such as a CD-ROM, a floppy disk, a hard drive, a digital versatile disk (DVD), a read-only memory (ROM), etc. Further, although the examples described above were described with reference to various flow diagrams, one of ordinary skill in the art will appreciate that many other methods may alternatively be used. For example, the order of execution of the blocks may be changed, and/or some or all of the blocks may be changed, eliminated, or combined.

What is claimed is:

1. A gaming apparatus, comprising:

a two dimensional (2D) display unit;

a value input device; and a controller operatively coupled to the 2D display unit and the value input device, the controller comprising a microprocessor and a memory operatively coupled to the microprocessor, and further comprising a graphics processor separate from the microprocessor, the graphics processor operatively coupled to the microprocessor and to the memory, the controller being configured to:

(a) allow a person to make a wager on an outcome of a game, (b) generate a mathematical model for a display of the game in a three dimensional (3D) graphics space, (c) derive from the mathematical model display data for the 2D display unit, the display data corresponding to a view of the display of the game projected onto a first plane in the 3D graphics space, (d) cause the 2D display unit to display the game according to the display data, (e) determine, after the game has been displayed, a value payout associated with the outcome of the game represented by the display data, (f) generate a mathematical model of a secondary display on a second plane in the 3D graphics space, the second plane located between the first plane and a viewpoint corresponding to the view, (g) associate a transparency attribute to at least a portion of the mathematical model of the secondary display, (h) derive display data for the 2D display unit, the display data corresponding to the secondary display viewed from the viewpoint and modified by the transparency attribute, and (i) cause the 2D display unit to display the secondary display overlapping, at least in part, the display of the game so that the secondary display appears at least partially transparent.

2. A gaming apparatus as defined in claim 1, wherein the microprocessor is configured to execute functions (a)-(c) and (e)-(h) and wherein the graphics processor is configured to:

receive display data; and execute functions (d) and (i).

3. A gaming apparatus as defined in claim 1, wherein the microprocessor is configured to execute functions (a)-(b) and (e); and;

wherein the graphics processor is configured to execute functions (c)-(d) and (f)-(i).

4. A gaming apparatus as defined in claim 1, wherein the secondary display is a tilt window.

5. A gaming apparatus as defined in claim 1, wherein the secondary display is a help window.

6. A gaming apparatus as defined in claim 1, wherein the secondary display is an icon.

7. A gaming apparatus as defined in claim 1, wherein the secondary display is a menu.

8. A gaming apparatus as defined in claim 1, wherein the secondary display is a button.

9. A gaming apparatus as defined in claim 3, wherein the microprocessor is configured to convert the display data corresponding to the view in the 3D graphics space into display data corresponding to a two dimensional (2D) view.

10. A gaming apparatus as defined in claim 3, wherein the microprocessor is configured to provide during execution of function (b) indications of graphics primitives in the 3D graphics space to the graphics processor, and wherein the graphics processor is configured to convert the indications of graphics primitives into display data causing the display unit to display the game during execution of step (d).

11. A gaming apparatus, comprising:

a two dimensional (2D) display unit;

a value input device; and a controller operatively coupled to the 2D display unit and the value input device, the controller comprising a microprocessor and a memory operatively coupled to the microprocessor, and further comprising a graphics processor separate from the microprocessor, the graphics processor operatively coupled to the microprocessor and to the memory; the controller being configured to:

(a) generate a mathematical model of a game in a three dimensional (3D) graphics space (b) convert a view of the game in the 3D graphics space into display data;

(c) cause the 2D display unit to display the view of the game according to the display data;

(d) allow a person to make a wager;

(e) determine an outcome of the game;

(f) determine a value payout associated with the outcome of the game;

(g) generate a mathematical model of a secondary display in the 3D graphics space between the mathematical model of the game and a viewpoint corresponding to the view;

(h) associate a transparency attribute to at least a portion of the mathematical model of the secondary display; and (i) cause the 2D display unit to display the secondary display according to the mathematical model of the secondary display so that the secondary display appears at least partially transparent and overlays, at least in part, the view of the game.

12. A gaming apparatus as defined in claim 11, wherein the microprocessor is configured to execute functions (a)-(b) and (d)-(h) and wherein the graphics processor is configured to receive information related to the representation of the game display, and wherein the graphics processor is configured execute functions (c) and (i).

13. A gaming apparatus as defined in claim 11, wherein the microprocessor is configured to execute functions (a)-(b) and (d)-(f); and wherein the graphics processor is configured to execute functions (c) and (g)-(i).

14. A gaming apparatus as defined in claim 11, wherein the microprocessor is configured to convert the display data corresponding to the view of the game in the 3D graphics space into display data corresponding to a two dimensional (2D) view.

15. A gaming apparatus as defined in 11, wherein the microprocessor is configured to provide, during execution of function (a), indications of graphics primitives in 3D graphics space to the graphics processor, and wherein the graphics processor is configured to convert the indications of graphics primitives into display data causing the display unit to display the game during execution of step (c).

16. A gaming apparatus as defined in claim 11, wherein the secondary display is a window.

17. A gaming apparatus as defined in claim 11, wherein the secondary display is a screen.

18. A gaming apparatus as defined in claim 11, wherein the secondary display is an icon.

19. A gaming apparatus as defined in claim 11, wherein the secondary display is a menu.

20. A gaming apparatus as defined in claim 11, wherein the secondary display is a button.

21. A gaming method comprising:

generating a mathematical model of a game in a three dimensional (3D) graphics space;

converting the mathematical model into display data corresponding to a view of the game;

displaying on a 2D display unit the view of the game;

determining a value payout associated with an outcome of the game;

generating a mathematical model of a secondary display in the 3D graphics space between the mathematical model of the game and a viewpoint corresponding to the view;

associating a transparency attribute to at least a portion of the mathematical model of the secondary display; and displaying the secondary display on the 2D display unit, the secondary display overlapping, at least in part, the view of the game, wherein the secondary display appears at least partially transparent according to the transparency attribute.

22. A gaming method as defined in claim 21, further comprising:

converting the view of the game into a 2D view.

23. A gaming method as defined in claim 21, further comprising:

providing indications of graphics primitives in the mathematical model of the game to a graphics processor; and converting the indications of graphics primitives into display data causing the 2D display unit to display the game.

24. A gaming method as defined in claim 21, wherein the secondary display is a tilt window.

25. A gaming method as defined in claim 21, wherein the secondary display is a help window.

26. A gaming method as defined in claim 21, wherein the secondary display is an icon.

27. A gaming method as defined in claim 21, wherein the secondary display is a menu.

28. A gaming method as defined in claim 21, wherein the secondary display is a button.

29. A memory having a computer program stored therein, the computer program configured to be used in connection with a gaming apparatus, the memory comprising:

a first memory portion physically configured in accordance with computer program instructions that, when executed, cause the gaming apparatus to allow a person to make a wager;

a second memory portion physically configured in accordance with computer program instructions that, when executed, cause the gaming apparatus to convert a mathematical model of a game in three dimensional (3D) graphics space into display data for a two dimensional (2D) display unit, a third memory portion physically configured in accordance with computer program instructions that, when executed, cause the gaming apparatus to display a view of the game on the 2D display unit according to the display data;

a fourth memory portion physically configured in accordance with computer program instructions that, when executed, cause the gaming apparatus to determine a value payout associated with an outcome of the game corresponding to the view of the game;

a fifth memory portion physically configured in accordance with computer program instructions that, when executed, cause the gaming apparatus to:

generate a mathematical model of a secondary display in the 3D graphics space between the mathematical model of the game and a viewpoint corresponding to the view;

associate a transparency attribute to at least a portion of the mathematical model of the secondary display; and cause the gaming apparatus to display the secondary display on the 2D display unit overlapping, at least in part, the view of the game, wherein the secondary display appears at least partially transparent according to the transparency attribute.

30. A memory as defined in claim 29, wherein the second memory portion is further physically configured in accordance with computer program instructions that, when executed, cause the gaming apparatus to:

convert the display data into a 2D representation of the game.

* * * * *